United States Patent
Shinohara et al.

(10) Patent No.: US 11,470,248 B2
(45) Date of Patent: Oct. 11, 2022

(54) DATA COMPRESSION APPARATUS, MODEL GENERATION APPARATUS, DATA COMPRESSION METHOD, MODEL GENERATION METHOD AND PROGRAM RECORDING MEDIUM

(71) Applicant: NEC CORPORATION, Tokyo (JP)

(72) Inventors: Yusuke Shinohara, Tokyo (JP); Takanori Iwai, Tokyo (JP); Hayato Itsumi, Tokyo (JP); Florian Beye, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/131,002

(22) Filed: Dec. 22, 2020

(65) Prior Publication Data
US 2021/0203840 A1 Jul. 1, 2021

(30) Foreign Application Priority Data

Dec. 26, 2019 (JP) .............................. JP2019-235655

(51) Int. Cl.
*H04N 5/232* (2006.01)
*H04N 7/18* (2006.01)
(Continued)

(52) U.S. Cl.
CPC ......... *H04N 5/23229* (2013.01); *G06N 20/00* (2019.01); *G06V 20/52* (2022.01); *H04N 7/18* (2013.01); *H04N 19/103* (2014.11)

(58) Field of Classification Search
CPC .... H04N 5/23229; H04N 19/103; H04N 7/18; G06N 20/00; G06K 9/00771
See application file for complete search history.

(56) References Cited

U.S. PATENT DOCUMENTS

| | | | |
|---|---|---|---|
| 2013/0251256 A1* | 9/2013 | Deng ................... | H04N 19/136 382/166 |
| 2015/0220793 A1* | 8/2015 | Kiyohara ............... | G06V 20/56 382/103 |

(Continued)

FOREIGN PATENT DOCUMENTS

| JP | 2006-101063 A | 4/2006 |
|---|---|---|
| JP | 2009-089354 A | 4/2009 |

(Continued)

OTHER PUBLICATIONS

Leonard Galteri et al., "Video Compression for Object Detection Algorithms", 2018 24th International Conference on Patten Recognition (ICPR), IEEE, Aug. 2018, 7 pages.

(Continued)

*Primary Examiner* — Sunghyoun Park
(74) *Attorney, Agent, or Firm* — Sughrue Mion, PLLC

(57) ABSTRACT

A data compression apparatus includes: a compression unit that performs a compression process on output data that is sequentially outputted as time series data by a monitoring apparatus for monitoring a monitoring target range; an output unit that outputs the output data on which the compression process is performed, to a data processing apparatus that performs an object detection process for detecting an object that exists in the monitoring target range by using the output data; and a setting unit that sets a compression ratio used in the compression unit, on the basis of an accuracy information indicating a relationship between a compression ratio at which the output data is compressed and a detection accuracy of the object by the object detection process performed by using the output data compressed at the compression ratio.

8 Claims, 15 Drawing Sheets

(51) Int. Cl.
      *G06N 20/00*      (2019.01)
      *H04N 19/103*     (2014.01)
      *G06V 20/52*      (2022.01)

(56) References Cited

U.S. PATENT DOCUMENTS

| | | |
|---|---|---|
| 2016/0057432 A1 | 2/2016 | Shibayama et al. |
| 2017/0150148 A1 | 5/2017 | Zhang et al. |
| 2017/0220879 A1* | 8/2017 | Nakamura .............. B60R 11/04 |
| 2017/0272791 A1* | 9/2017 | Washino ............ H04N 21/4782 |
| 2018/0004275 A1* | 1/2018 | Tubbs ................... G06F 1/3287 |
| 2018/0068540 A1* | 3/2018 | Romanenko ......... H04N 19/117 |
| 2018/0365849 A1* | 12/2018 | Taguchi .................. G06T 5/002 |
| 2021/0064884 A1* | 3/2021 | Elgamal ................ H04N 19/87 |

FOREIGN PATENT DOCUMENTS

| | | | |
|---|---|---|---|
| JP | 2016-046707 A | 4/2016 | |
| JP | 2018-505571 A | 2/2018 | |

OTHER PUBLICATIONS

Wei Huang et al., "QoE-Oriented Resource Allocation for 360-degree Video Transmission over Heterogeneous Networks", arXiv 1803.07789, Mar. 2018, 12 pages.
Joseph Redmon et al., "You Only Look Once: Unified, Real-Time Objection Detection", arXiv 1506.02640, May 2016, 10 pages.
Wei Liu et al., "SSD: Single Shot MultiBox Detector", arXiv 1512.02325, Dec. 2015, 17 pages.
Gregory P. Meyer et al., "LaserNet: An Efficient Probabilistic 3D Object Detector for Autonomous Driving", arXiv 1903.08701, Mar. 2019, 10 pages.

* cited by examiner

FIG. 11

| OBJECT DETECTION POSITION | COMPRESSION RATIO OF IMAGE DATA THAT ALLOWS OBJECT TO BE DETECTED |
|---|---|
| (xmin#1, ymin#1, xmax#1, ymax#1) | 10% |
| (xmin#1, ymin#1, xmax#1, ymax#1) | 30% |
| (xmin#1, ymin#1, xmax#1, ymax#1) | 50% |
| (xmin#2, ymin#2, xmax#2, ymax#2) | 10% |
| (xmin#2, ymin#2, xmax#2, ymax#2) | 30% |
| (xmin#3, ymin#3, xmax#3, ymax#3) | 10% |
| ... | ... |

| OBJECT DETECTION POSITION | COMPRESSION RATIO OF IMAGE DATA THAT ALLOWS OBJECT TO BE DETECTED |
|---|---|
| (xmin#1, ymin#1, xmax#1, ymax#1) | 10% |
| (xmin#1, ymin#1, xmax#1, ymax#1) | 30% |
| (xmin#1, ymin#1, xmax#1, ymax#1) | 50% |
| (xmin#2, ymin#2, xmax#2, ymax#2) | 10% |
| (xmin#2, ymin#2, xmax#2, ymax#2) | 30% |
| (xmin#3, ymin#3, xmax#3, ymax#3) | 10% |
| (xmin#3, ymin#3, xmax#3, ymax#3) | 30% |
| (xmin#3, ymin#3, xmax#3, ymax#3) | 50% |
| (xmin#3, ymin#3, xmax#3, ymax#3) | 80% |
| ... | ... |

| OBJECT DETECTION POSITION | MAXIMUM COMPRESSION RATIO OF IMAGE DATA THAT ALLOWS OBJECT TO BE DETECTED |
|---|---|
| (xmin#1, ymin#1, xmax#1, ymax#1) | 50% |
| (xmin#2, ymin#2, xmax#2, ymax#2) | 30% |
| (xmin#3, ymin#3, xmax#3, ymax#3) | 80% |
| ... | ... |

423

DATA COMPRESSION APPARATUS, MODEL GENERATION APPARATUS, DATA COMPRESSION METHOD, MODEL GENERATION METHOD AND PROGRAM RECORDING MEDIUM

INCORPORATION BY REFERENCE

This application is based upon and claims the benefit of priority from the prior Japanese Patent Application No. 2019-235655, filed on Dec. 26, 2019, the disclosure of which is incorporated herein in its entirety by reference.

TECHNICAL FIELD

Embodiments of the present disclosure relate to a data compression apparatus, a data compression method and a program recording medium that perform a compression process for compressing data, and a model generation apparatus, a model generation method and a program recording medium that generate an arithmetic model used for setting a compression ratio for compressing data.

BACKGROUND ART

Various techniques have been proposed for compressing a plurality of image data (in other words, an image dataset and an image record) that constitute moving image data. For example, a Non-Patent Literature 1 discloses a technique for setting, on the basis of the features of the image, a compression ratio used when each part of an image represented by each image data is compressed. For example, a Non-Patent Literature 2 discloses a technique for compressing each image data so as to enhance the image quality of a visually remarkable area, which a human naturally gazes at, of the image represented by each image data and to reduce the image quality of an area, which a viewer does not look at, of the image represented by each image data.

In addition, a Patent Literature 1 to a Patent Literature 4 and a Non-Patent Literature 3 to a Non-Patent Literature 5 are cited as related art documents related to the present disclosure.

Patent Literature

[Patent Literature 1] JP2018-505571A1;
[Patent Literature 2] JP2016-046707A1;
[Patent Literature 3] JP2009-089354A1;
[Patent Literature 4] JP2006-101063A1;

Non-Patent Literature

[Non-Patent Literature 1] Leonard Galteri et al., "Video Compression for Obect Detection Algorithms", 2018 24th International Conference on Patten Recognition (ICPR), IEEE, August 2018;
[Non-Patent Literature 2] Wei Huang et al., "QoE-Oriented Resource Allocation for 360-degree Video Transmission over Heterogeneous Networks", arXiv 1803.07789, March 2018
[Non-Patent Literature 3] Joseph Redmon et al., "You Only Look Once: Unified, Real-Time Objection Detection", arXiv 1506.02640, May 2016;
[Non-Patent Literature 4] Wei Liu et al., "SSD: Single Shot MultiBox Detector", arXiv 1512.02325, December 2015; and
[Non-Patent Literature 5] Gregory P. Meyer al., "LaserNet: An efficient Probabilistic 3D Object Detector for Autonomous Driving", arXiv 1903.08701, March 2019.

SUMMARY

An object detection process may be performed on the compressed image data to detect an object that is included in the image represented by the image data. In the above-described the Non-Patent Literatures 1 and 2, however, when the image data is compressed, characteristics of the object detection process are not considered at all. Therefore, the techniques disclosed in the Non-Patent Literatures 1 and 2 have such a technical problem that the image data may not be properly compressed when the object detection process is performed on the compressed image data.

A target for the object detection process described above is not limited to the image data (e.g., image data outputted by a camera that images a predetermined imaging range to monitor the imaging range). For example, the object detection process described above may be also performed on any output data (e.g., point clouds data outputted by a three-dimensional scanner such as a LIDAR (Light Detection and Ranging)) that is sequentially outputted as time series data by any monitoring apparatus for monitoring a monitoring target range in which an object may exist. Therefore, the technical problems described above may occur even when the output data outputted by any monitoring apparatus is compressed. That is, there is such a technical problem that the output data may not be properly compressed when the object detection process is performed on the compressed output data.

In view of the problems described above, it is therefore an example object of the present disclosure to provide a data compression apparatus, a model generation apparatus, a data compression method, a model generation method and a program recording medium that can solve the problems described above. As one example, the example object of the present disclosure is to provide a data compression apparatus, a model generation apparatus, a data compression method, a model generation method and a program recording medium that are configured to properly compress data on which an object detection process is performed.

In an example aspect of the present disclosure, a data compression apparatus includes a controller, wherein the controller is programmed to: compress output data that is sequentially outputted as time series data by a monitoring apparatus for monitoring a monitoring target range; output the compressed output data to a data processing apparatus that detects an object that exists in the monitoring target range by using the output data; and set a compression ratio used by the controller for compressing the output data, on the basis of an accuracy information that indicates a relationship between a compression ratio at which the output data is compressed and a detection accuracy of the object detected by the data processing apparatus by using the output data compressed at the compression ratio.

In an example aspect of the present disclosure, a model generation apparatus includes a controller, wherein the controller is programmed to: compress learning data, which includes at least one of output data that is sequentially outputted as time series data by a monitoring apparatus for monitoring a monitoring target range and homogeneous data a data type of which is same as that of the output data, at each of a plurality of different compression ratios included in a compression ratio list; detect an object that exists in the monitoring target range by using the learning data compressed at each of the plurality of different compression ratios; generate an arithmetic model that is used to infer an accuracy relating to a relationship between a compression ratio at which the learning data is compressed and a detection accuracy of the object detected by using the learning data compressed at the compression ratio, on the basis of a detection result by the controller and the plurality of different compression ratios used for compression by the controller; and output the generated arithmetic model to a data compression apparatus that sets a compression ratio for compressing the output data by using the arithmetic model and that compresses the output data at the set compression ratio.

In an example aspect of the present disclosure, a data compression method, which is performed by a computer, includes: performing a compression process of compressing output data that is sequentially outputted as time series data by a monitoring apparatus for monitoring a monitoring target range; outputting the output data on which the compression process is performed, to a data processing apparatus that performs an object detection process for detecting an object that exists in the monitoring target range by using the output data; and setting a compression ratio used in the compression process, on the basis of an accuracy information that indicates a relationship between a compression ratio at which the output data is compressed and a detection accuracy of the object by the object detection process performed by using the output data compressed at the compression ratio.

In an example aspect of the present disclosure, a model generation method, which is performed by a computer, includes: performing a compression process of compressing learning data, which includes at least one of output data that is sequentially outputted as time series data by a monitoring apparatus for monitoring a monitoring target range and homogeneous data a data type of which is same as that of the output data, at each of a plurality of different compression ratios included in a compression ratio list; performing an object detection process for detecting an object that exists in the monitoring target range by using the learning data on which the compression process is performed at each of the plurality of different compression ratios; generating an arithmetic model that is used to infer an accuracy information relating to a relationship between a compression ratio at which the learning data is compressed and a detection accuracy of the object by the object detection process performed by using the learning data compressed at the compression ratio, on the basis of a result of the object detection process and the plurality of different compression ratios used in the compression process; and outputting the generated arithmetic model to a data compression apparatus that sets a compression ratio for compressing the output data by using the arithmetic model and that compresses the output data at the set compression ratio.

In an example aspect of the present disclosure, on a non-transitory program recording medium, a computer program that allows a computer to execute a data compression method is recorded, the data compression method includes: performing a compression process of compressing output data that is sequentially outputted as time series data by a monitoring apparatus for monitoring a monitoring target range; outputting the output data on which the compression process is performed, to a data processing apparatus that performs an object detection process for detecting an object that exists in the monitoring target range by using the output data; and setting a compression ratio used in the compression process, on the basis of an accuracy information that indicates a relationship between a compression ratio at which the output data is compressed and a detection accuracy of the object by the object detection process performed by using the output data compressed at the compression ratio.

In another example aspect of the present disclosure, on a non-transitory program recording medium, a computer program that allows a computer to execute a model generation method is recorded, the model generation method includes: performing a compression process of compressing learning data, which includes at least one of output data that is sequentially outputted as time series data by a monitoring apparatus for monitoring a monitoring target range and homogeneous data a data type of which is same as that of the output data, at each of a plurality of different compression ratios included in a compression ratio list; performing an object detection process for detecting an object that exists in the monitoring target range by using the learning data on which the compression process is performed at each of the plurality of different compression ratios; generating an arithmetic model that is used to infer an accuracy information relating to a relationship between a compression ratio at which the learning data is compressed and a detection accuracy of the object by the object detection process performed by using the learning data compressed at the compression ratio, on the basis of a result of the object detection process and the plurality of different compression ratios used in the compression process; and outputting the generated arithmetic model to a data compression apparatus that sets a compression ratio for compressing the output data by using the arithmetic model and that compresses the output data at the set compression ratio.

BRIEF DESCRIPTION OF THE DRAWINGS

FIG. 11 is a data structure diagram illustrating label data including an object detection position associated with a compression ratio;

FIG. 15 is a data structure diagram illustrating label data used to generate the detection probability inference model in the example embodiment;

FIG. 16 is a data structure diagram illustrating label data used to generate the detection probability inference model in a first modified example;

EXAMPLE EMBODIMENT

Hereinafter, with reference to the drawings, a description will be given to a data compression apparatus, a model generation apparatus, a data compression method, a model generation method and the program recording medium according to example embodiments. A description will be given below to a data compression system SYS to which the data compression apparatus, the model generation apparatus, the data compression method, the model generation method and the program recording medium according to example embodiments are applied.

<1> Configuration of Data Compression System SYS

<1-1> Overall Configuration of Data Compression System SYS

Figure 1:
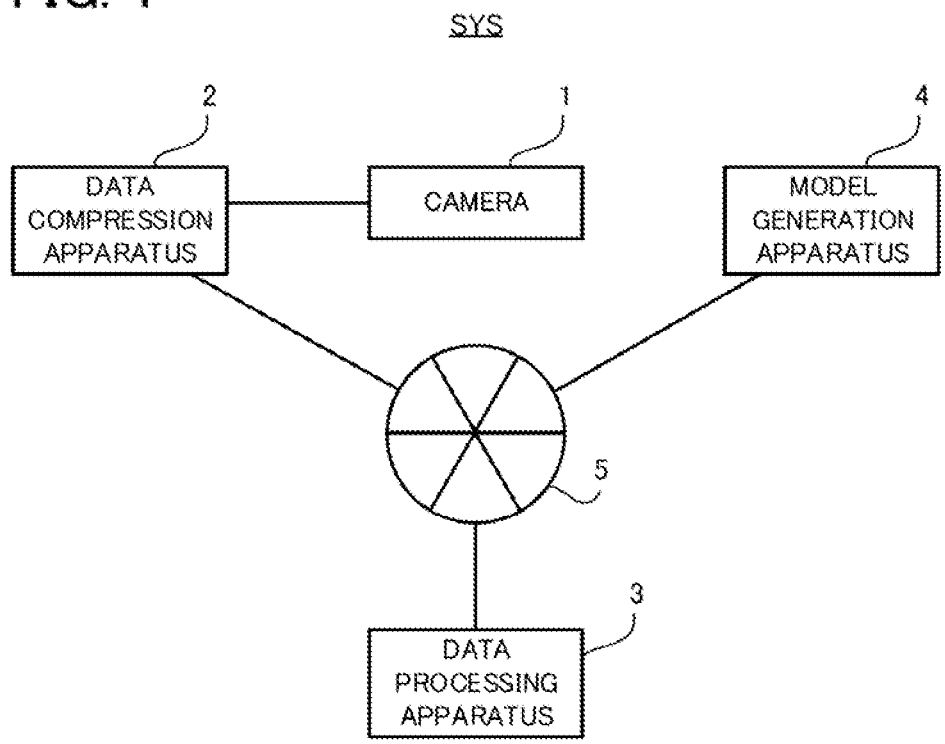
FIG. 1 is a block diagram illustrating an overall configuration of a data compression system according to an example embodiment.

Firstly, an overall configuration of the data compression system SYS according to an example embodiment will be described with reference to FIG. 1. FIG. 1 is a block diagram illustrating the overall configuration of the data compression system SYS according to the example embodiment.

As illustrated in FIG. 1, the data compression system SYS is provided with a camera 1, a data compression apparatus 2, a data processing apparatus 3, and a model generation apparatus 4. The data compression apparatus 2, the data processing apparatus 3, and the model generation apparatus 4 are configured to communicate with each other through a communication network 5. The communication network 5 may include at least one of a wired communication network and a wireless communication network.

Figure 2:
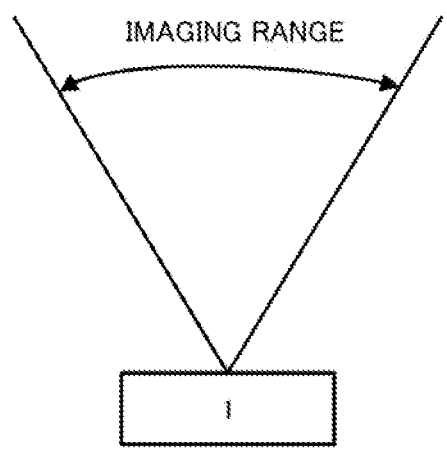
FIG. 2 is a plan view illustrating a imaging range of a camera.

The camera 1 is an imaging device that is configured to image a view included in a predetermined imaging range (in other words, an imaging angle of view) determined by characteristics of an optical system of the camera 1. The imaging range of the camera 1 may be, for example, a range (typically, a space) that spreads from the camera 1 to some extent, as illustrated in FIG. 2. The camera 1 images the imaging range at a predetermined imaging rate (e.g., an imaging rate of imaging the imaging range 30 times per second). As a result, the camera 1 outputs a plurality of image data (in other words, a moving image frame) each of which represents a situation of the imaging range, as time series data. That is, the camera 1 outputs moving image data (i.e., video data) including a plurality of image data.

The data compression apparatus 2 obtains the moving image data outputted from the camera 1. The data compression apparatus 2 performs a data compression operation for compressing the moving image data obtained from the camera 1 and transmitting the compressed moving image data to the data processing apparatus 3. In other words, the data compression apparatus 2 performs the data compression operation for compressing a plurality of image data that constitute the moving image data and transmitting the moving image data including the plurality of compressed image data to the data processing apparatus 3. At this time, the data compression apparatus 2 sets a compression ratio for compressing the image data, by using a detection probability inference model 221 generated by the model generation apparatus 4.

In the example embodiment, for convenience of explanation, the compression ratio shall mean a ratio of an absolute value of a difference between a data size of the image data before compression and a data size of the image data after compression, with respect to the data size of the image data before compression. Therefore, for example, when the image data is compressed at a compression ratio of 10%, the data size of the image data after compression is 90% of the data size of the image data before compression. Note that in the example embodiment and modified examples, a description of a compression ratio of x % shall mean "a compression ratio x % (a compression ratio is x %)".

Compressing the image data may be considered to be equivalent to encoding the image data so as to reduce the data size of the image data. For this reason, the data compression apparatus 2 may be referred to as a data encoding apparatus. For similar reasons, the data compression system SYS may be referred to as a data encoding system.

The data processing apparatus 3 receives the moving image data (i.e., the compressed moving image data) transmitted from the data compression apparatus 2. The data processing apparatus 3 performs predetermined data processing on the received moving image data. In the example embodiment, the data processing apparatus 3 performs an object detection process as an example of the predetermined data processing. The object detection process is a process of detecting an object that exists in the imaging range of the camera 1 at a time point when the camera 1 images the imaging range, by using each of the image data that constitute the moving image data. In other words, the object detection process is a process of detecting an object that is included in an image represented by each image data. A result of the object detection process may be used in a desired application (e.g., an application for remotely driving a vehicle, as described later).

The model generation apparatus 4 performs a model generation operation for generating the detection probability inference model 221 and transmitting the generated detection probability inference model 221 to the data compression apparatus 2. The detection probability inference model 221 is, as described above, an arithmetic model that is used to set the compression ratio used when the data compression apparatus 2 compresses the image data. Since the detection probability inference model 221 will be described in detail later, a detailed description thereof is omitted here.

An example of such a data compression system SYS may include a remote driving system for remotely driving a vehicle such as an automobile. In this case, the camera 1 may be mounted on the vehicle. The data compression apparatus 2 may also be mounted on the vehicle. The data compression apparatus 2, however, may not be mounted on the vehicle. For example, the data compression apparatus 2 may be a server that is configured to communicate with the vehicle through the communication network 5. Moreover, the data processing apparatus 3 may be a server that is configured to communicate with the vehicle through the communication network 5. The data processing apparatus 3, however, may be mounted on the vehicle. In such a remote driving system, the camera 1 images a view of in surroundings of the vehicle. The moving image data (or image data) captured by the camera 1 is compressed by the data compression apparatus 2 and is then transmitted to the data processing apparatus 3. The data processing apparatus 3 detects an object that exists in the surroundings of the vehicle by performing the object detection process on the received image data. As a result, a remote operator may remotely operate the vehicle through the communication network 5 on the basis of the result of the object detection process of the data processing apparatus 3. Alternatively, a vehicle control apparatus for remotely driving the vehicle may remotely operate the vehicle through the communication network 5 on the basis of the result of the object detection process of the data processing apparatus 3.

<1-2> Configuration of Data Compression Apparatus 2

Figure 3:
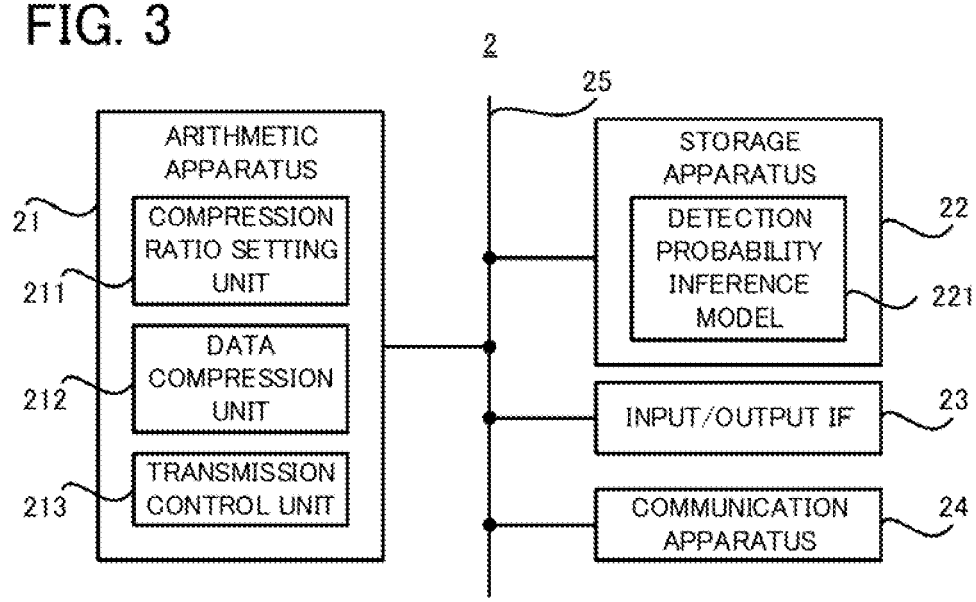
FIG. 3 is a block diagram illustrating a configuration of a data compression apparatus.

Next, with reference to FIG. 3, a configuration of the data compression apparatus 2 will be described. FIG. 3 is a block diagram illustrating the configuration of the data compression apparatus 2.

As illustrated in FIG. 3, the data compression apparatus 2 is provided with an arithmetic apparatus 21, a storage apparatus 22, an input/output IF (Interface) 23, and a communication apparatus 24. The arithmetic apparatus 21, the storage apparatus 22, the input/output IF 23, and the communication apparatus 24 may be connected through a data bus 25.

The arithmetic apparatus 21 includes at least one of a CPU (Central Processing Unit) and a GPU (Graphic Processing Unit). The arithmetic apparatus 21 reads a computer program. For example, the arithmetic apparatus 21 may read a computer program stored in the storage apparatus 22. For example, the arithmetic apparatus 21 may read a computer program stored in a computer-readable recording medium, by using a not-illustrated recording medium reading apparatus. The arithmetic apparatus 21 may obtain (i.e., may download or read) a computer program from a not-illustrated apparatus disposed outside the data compression apparatus 2, through the communication apparatus 24. The arithmetic apparatus 21 executes the read computer program. As a result, a logical function block for performing an operation to be performed by the data compression apparatus 2 (e.g., the data compression operation described above) is realized in the arithmetic apparatus 21. That is, the arithmetic apparatus 21 is allowed to function as a controller for realizing the logical function block for performing the operation to be performed by the data compression apparatus 2.

FIG. 3 illustrates an example of the logical function block realized in the arithmetic apparatus 21 to perform the data compression operation. As illustrated in FIG. 3, a compression ratio setting unit 211, a data compression unit 212, and a transmission control unit 213 are realized in the arithmetic apparatus 21. The operation of each of the compression ratio setting unit 211, the data compression unit 212 and the transmission control unit 213 will be described in detail later with reference to FIG. 13 and the like, but its outline is briefly described here. The compression ratio setting unit 211 sets the compression ratio for compressing the image data, by using the detection probability inference model 221 generated by the model generation apparatus 4. The data compression unit 212 performs a compression process for compressing the image data on the image data obtained from the camera 1, at the compression ratio set by the compression ratio setting unit 211. The transmission control unit 213 transmits the image data on which the compression process is performed by the data compression unit 212, to the data processing apparatus 3, by using the communication apparatus 24.

The storage apparatus 22 is configured to store therein desired data. For example, the storage apparatus 22 may temporarily store a computer program to be executed by the arithmetic apparatus 21. The storage apparatus 22 may temporarily store the data that is temporarily used by the arithmetic apparatus 21 when the arithmetic apparatus 21 executes the computer program. The storage apparatus 22 may store the data that is stored for a long term by data compression apparatus 2. Especially in the example embodiment, the storage apparatus 22 stores the detection probability inference model 221 used when the compression ratio setting unit 211 sets the compression ratio. Note that the storage apparatus 22 may include at least one of a RAM (Random Access Memory), a ROM (Read Only Memory), a hard disk device, a magneto-optical disk device, an SSD (Solid State Drive) and a disk array device.

The input/output IF 23 is an apparatus for transmitting and receiving data between the data compression apparatus 2 and the camera 1. Therefore, the data compression apparatus 2 obtains the moving image data (i.e., image data) from the camera 1 through the input/output IF 23.

The communication apparatus 24 is configured to communicate with the data processing apparatus 3 and the model generation apparatus 4 through the communication network 5. In the example embodiment, the communication apparatus 24 is configured to receive the detection probability inference model 221 generated by the model generation apparatus 4 from the model generation apparatus 4 through the communication network 5. Moreover, the communication apparatus 24 is configured to transmit the image data (i.e., moving image data) compressed by the data compression unit 212 to the data processing apparatus 3 through the communication network 5.

Note that the communication apparatus 24 may be configured to communicate with the camera 1 through the communication network 5 or another not-illustrated communication network. In this case, the data compression apparatus 2 may obtain the moving image data (i.e., image data) from the camera 1 through the communication apparatus 24, in addition to or in place of the input/output IF 23. If the moving image data is obtained from the camera 1 through the communication apparatus 24, the data compression apparatus 2 may not include the input/output IF 23.

<1-3> Configuration of Data Processing Apparatus 3

Figure 4:
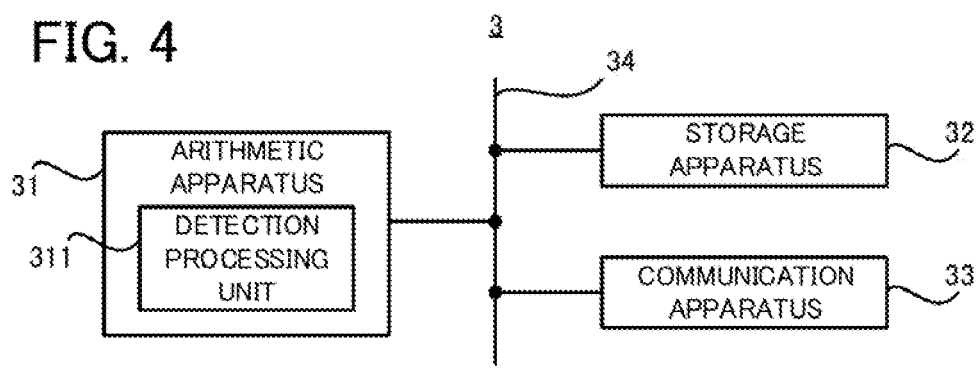
FIG. 4 is a block diagram illustrating a configuration of a data processing apparatus.

Next, with reference to FIG. 4, a configuration of the data processing apparatus 3 will be described. FIG. 4 is a block diagram illustrating the configuration of the data processing apparatus 3.

As illustrated in FIG. 4, the data processing apparatus 3 is provided with an arithmetic apparatus 31, a storage apparatus 32, and a communication apparatus 33. The arithmetic apparatus 31, the storage apparatus 32, and the communication apparatus 33 may be connected through a data bus 34.

The arithmetic apparatus 31 includes at least one of a CPU and a GPU. The arithmetic apparatus 31 reads a computer program. For example, the arithmetic apparatus 31 may read a computer program stored in the storage apparatus 32. For example, the arithmetic apparatus 31 may read a computer program stored in a computer-readable recording medium, by using a not-illustrated recording medium reading apparatus. The arithmetic apparatus 31 may obtain (i.e., may download or read) a computer program from a not-illustrated apparatus disposed outside the data processing apparatus 3 through the communication apparatus 33. The arithmetic apparatus 31 executes the read computer program. As a result, a logical function block for performing an operation to be performed by the data processing apparatus 3 (e.g., an operation including the object detection process described above) is realized in the arithmetic apparatus 31. That is, the arithmetic apparatus 31 is allowed to function as a controller for realizing the logical function block for performing the operation to be performed by the data processing apparatus 3.

FIG. 4 illustrates an example of the logical function block to be realized in the arithmetic apparatus 31. As illustrated in FIG. 4, a detection processing unit 311 is realized in CPU31. The detection processing unit 311 performs the object detection process on each of the image data that constitute the moving image data transmitted from the data compression apparatus 2. The detection processing unit 311 may perform the object detection process by using an operation model that uses a neural network (e.g., CNN: Convolutional Neural Network). At this time, the detection processing unit 311 may perform the object detection process that conforms to an arbitrary object detection method. An example of the object detection method includes at least one of an object detection method using an object detection algorithm referred to as "Objectness" and an object detection method using an object detection algorithm referred to as "CenterNet".

The object detection process includes a process of detecting an object that is included in the image represented by the image data. The process of detecting the object that is included in the image may include a process of specifying coordinates of an area in which an object is detected in the image. The coordinates of the area in which an object is detected in the image may include, for example, minimum coordinates and maximum coordinates of a rectangular area (a so-called box) that includes the object in the image. The object detection process may also include a process of identifying (in other words, recognizing) a class of the detected object, in addition to the process of detecting the object that is included in the image. That is, the object detection process may include a process of classifying the type of the detected object.

Note that when the result of the object detection process is used in the desired application as described above, a functional block for performing a process relating to the desired application may be realized in the arithmetic apparatus 31. For example, when the result of the object detection process is used in the applications for remotely driving the vehicle as described above, a functional block for remotely driving the vehicle on the basis of the result of the object detection process may be realized in the arithmetic apparatus 31.

The storage apparatus 32 is configured to store therein desired data. For example, the storage apparatus 32 may temporarily store a computer program to be executed by the arithmetic apparatus 31. The storage apparatus 32 may temporarily store the data that is temporarily used by the arithmetic apparatus 31 when the arithmetic apparatus 31 executes the computer program. The storage apparatus 32 may store the data that is stored for a long term by the data processing apparatus 3. The storage apparatus 32 may include at least one of a RAM, a ROM, a hard disk device, a magneto-optical disk device, an SSD, and a disk array device.

The communication apparatus 33 is configured to communicate with the data compression apparatus 2 through the communication network 5. In the example embodiment, the communication apparatus 33 is configured to receive the image data (i.e., moving image data) compressed by the data compression apparatus 2 from the data compression apparatus 2 through the communication network 5.

<1-4> Configuration of Model Generation Apparatus 4

Figure 5:
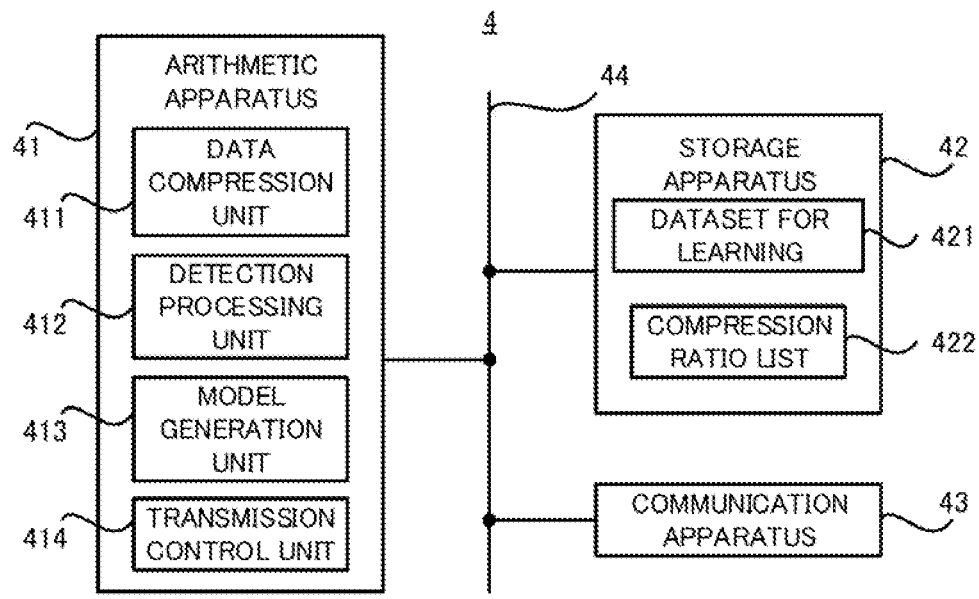
FIG. 5 is a block diagram illustrating a configuration of a model generation apparatus.

Next, with reference to FIG. 5, a configuration of the model generation apparatus 4 will be described. FIG. 5 is a block diagram illustrating the configuration of the model generation apparatus 4.

As illustrated in FIG. 5, the model generation apparatus 4 is provided with an arithmetic apparatus 41, a storage apparatus 42, and a communication apparatus 43. The arithmetic apparatus 41, the storage apparatus 42, and the communication apparatus 43 may be connected through a data bus 44.

The arithmetic apparatus 41 includes at least one of a CPU and a GPU. The arithmetic apparatus 41 reads a computer program. For example, the arithmetic apparatus 41 may read a computer program stored in the storage apparatus 42. For example, the arithmetic apparatus 41 may read a computer program stored in a computer-readable recording medium, by using a not-illustrated recording medium reading apparatus. The arithmetic apparatus 41 may obtain (i.e., may download or read) a computer program from a not-illustrated apparatus disposed outside the model generation apparatus 4 through the communication apparatus 43. The arithmetic apparatus 41 executes the read computer program. As a result, a logical function block for performing an operation to be performed by the model generation apparatus 4 (e.g., the model generation operation described above) is realized in the arithmetic apparatus 41. That is, the arithmetic apparatus 41 is allowed to function as a controller for realizing the logical function block for performing the operation to be performed by the model generation apparatus 4.

FIG. 5 illustrates an example of the logical function block realized in the arithmetic apparatus 41 to perform the model generation operation. As illustrated in FIG. 5, a data compression unit 411, a detection processing unit 412, a model generation unit 413, and a transmission control unit 414 are realized in the arithmetic apparatus 41. The operation of each of the data compression unit 411, the detection processing unit 412, the model generation unit 413 and the transmission control unit 414 will be described in detail later with reference to FIG. 6 to FIG. 12 and the like, but its outline will be briefly described here. The data compression unit 411 performs, on at least one image data included in a learning dataset 421 stored in the storage apparatus 42, a compression process for compressing the image data at each of a plurality of different compression ratios included in a compression ratio list 422 stored in the storage apparatus 42. The detection processing unit 412 performs the object detection process on the image data on which the compression process is performed by the data compression unit 411. The model generation unit 413 generates the detection probability inference model 221 by using a plurality of compression ratios used by the data compression unit 411 to compress the image data, and by using a result of the object detection process performed by the detection processing unit 412. A method of generating the detection probability inference model 221 will be described in detail later. The transmission control unit 414 transmits the detection probability inference model 221 generated by the model generation unit 413 to the data processing apparatus 3 by using the communication apparatus 43.

The storage apparatus 42 is configured to store therein desired data. For example, the storage apparatus 42 may temporarily store a computer program to be executed by the arithmetic apparatus 41. The storage apparatus 42 may temporarily store the data that is temporarily used by the arithmetic apparatus 41 when the arithmetic apparatus 41 executes the computer program. The storage apparatus 42 may store the data that is stored for a long term by model generation apparatus 4. Especially in the example embodiment, the storage apparatus 42 stores the learning dataset 421 that includes the image data on which the data compression unit 411 performs the compression process to generate the detection probability inference model 221. Moreover, the storage apparatus 42 stores the compression ratio list 422 that specifies a plurality of different compression ratios used by the data compression unit 411 to compress the image data. Note that the storage apparatus 42 may include at least one of a RAM, a ROM, a hard disk device, a magnetic-optical disk device, an SSD, and a disk array device.

The communication apparatus 43 is configured to communicate with the data compression apparatus 2 through the communication network 5. In the example embodiment, the communication apparatus 43 is configured to transmit the detection probability inference model 221 generated by the model generation unit 413 to the data compression apparatus 2 through the communication network 5.

<2> Operation of Data Compression System SYS

Next, the operation of the data compression system SYS will be described. In the following, the model generation operation performed by the model generation apparatus 4 and the data compression operation performed by the data compression apparatus 2 will be described in order as at least a part of the operation performed by the data compression system SYS.

<2-1> Model Generation Operation

Figure 6:
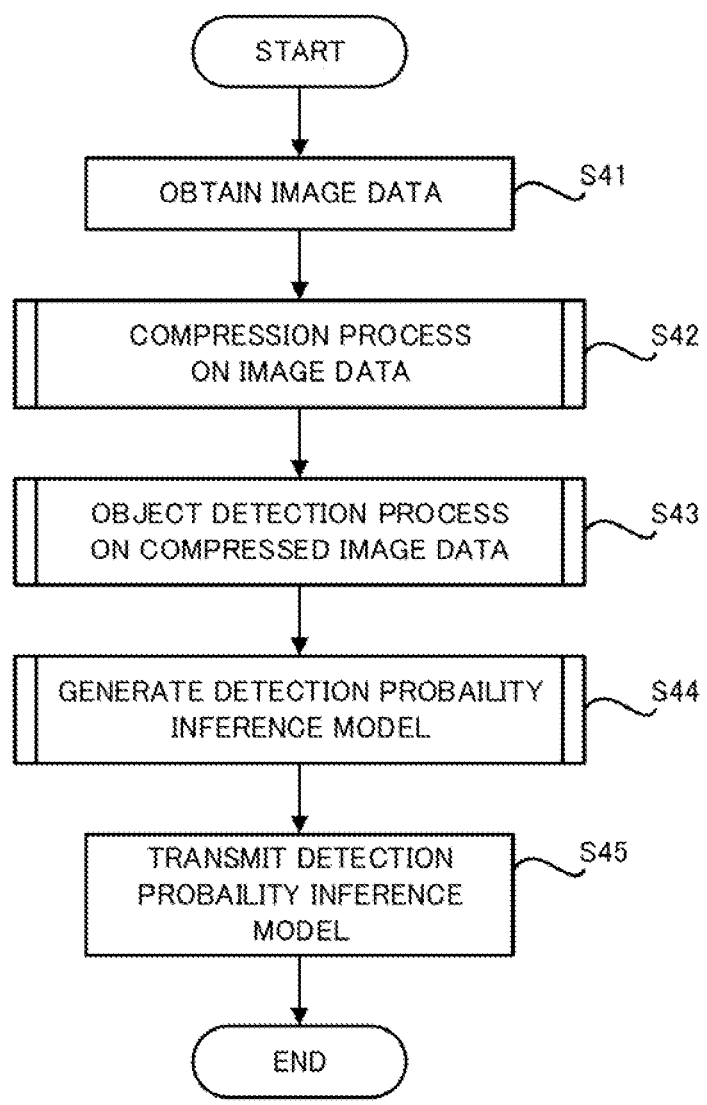
FIG. 6 is a flowchart illustrating a flow of a model generation operation performed by the model generation apparatus.

Firstly, with reference to FIG. 6, a flow of the model generation operation performed by the model generation apparatus 4 will be described. FIG. 6 is a flowchart illustrating the flow of the model generating operation performed by the model generation apparatus 4.

As illustrated in FIG. 6, the data compression unit 411 obtains the image data used to generate the detection probability inference model 221, from the learning dataset 421 stored in the storage apparatus 42 (step S41). The learning dataset 421 may include the image data obtained from the camera 1. Alternatively, the learning dataset 421 may include the image data that is different from the image data obtained from the camera 1. That is, the learning dataset 421 may include the image data that is not the image data obtained from the camera 1 but has the same data type as that of the image data obtained from the camera 1. The data compression unit 411 preferably obtains a plurality of image data. The data compression unit 411 may obtain a plurality of image data that constitute a series of moving image data. The data compression unit 411 may obtain a plurality of image data including the image data that constitutes one moving image data and the image data that constitutes another moving image data that is different from the one moving image data. The data compression unit 411 may obtain a plurality of arbitrary image data independently of the moving image data. The data compression unit 411, however, may obtain a single image data. In the following, for convenience of explanation, a description will be given to an example in which the data compression unit 411 obtains a plurality of image data.

Figure 7:
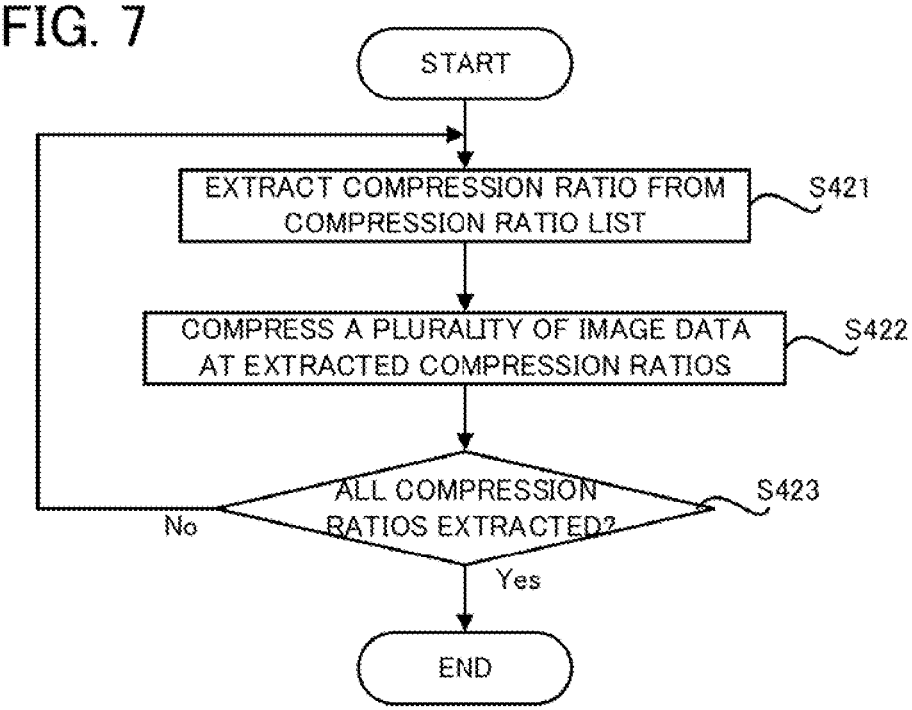
FIG. 7 is a flowchart illustrating a flow of a compression process performed in a step S42 in FIG. 6.

Thereafter, the data compression unit 411 performs the compression process on each of the plurality of image data obtained in the step S41 (step S42). Hereinafter, with reference to FIG. 7, a description will be given to a flow of the compression process performed in the step S42. FIG. 7 is a flowchart illustrating the flow of the compression process performed in the step S42 in FIG. 6.

As illustrated in FIG. 7, the data compression unit 411 extracts one compression ratio from the compression ratio list 422 stored in the storage apparatus 42 (step S421). Then, the data compression unit 411 performs a compression process of compressing each image data at the compression ratio extracted in the step S421, on each of the plurality of image data obtained in the step S41 in FIG. 6 (step S422). The process from the step S421 to the step S422 is repeated until all the plurality of compression ratios included in the compression ratio list 422 are extracted in the step S421 (step S423). The compressed image data may be temporarily stored in the storage apparatus 42 in a state of being associated with the compression ratio used when compressing the image data.

For example, when the compression ratio list 422 includes four types of compression ratios: 10%, 30%, 50%, and 80% as the plurality of compression ratios, the data compression unit 411 performs a compression process of compressing the image data at a compression ratio of 10%, a compression process of compressing the image data at a compression ratio of 30%, a compression process of compressing the image data at a compression ratio of 50%, and a compression process of compressing the image data at a compression ratio of 80%.

Note that the compression ratio list 422 may include a compression ratio of "0%". In this case, the data compression unit 411 does not need to compress the image data. This is because the image data compressed at a compression ratio of 0% is the same as the image data that is not compressed. In this case, the image data obtained from the learning dataset 421 may be used as the image data that is compressed at a compression ratio of 0%.

Figure 8:
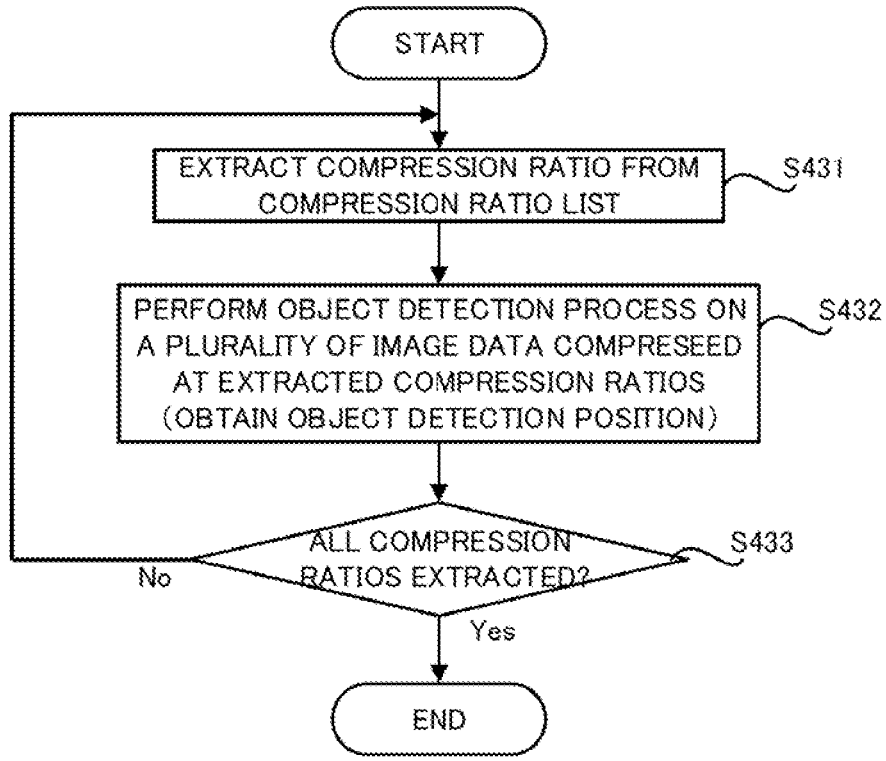
FIG. 8 is a flowchart illustrating a flow of an object detection process performed in a step S43 in FIG. 6.

Back in FIG. 6, after the compression process is performed at the plurality of different compression ratios on each of the plurality of image data, the detection processing unit 412 performs the object detection process on each of the image data on which the compression process is performed (step S43). Hereinafter, with reference to FIG. 8, a flow of the object detection process performed in the step S43 will be described. FIG. 8 is a flowchart illustrating the flow of the object detection process performed in the step S43 in FIG. 6.

As illustrated in FIG. 8, the detection processing unit 412 extracts one compression ratio from the compression ratio list 422 stored in the storage apparatus 42 (step S431). Then, the detection processing unit 412 performs object detection process on each of the plurality of image data compressed by using the compression ratio extracted in the step S431 (step S432). The process from step S431 to step S432 is repeated until all the plurality of compression ratios included in the compression ratio list 422 are extracted in the step S431 (step S433).

For example, when the compression ratio list 422 includes four types of reduction ratios: 10%, 30%, 50%, and 80%, as the plurality of compression ratios, the detection processing unit 412 performs an object detection process on the image data that is compressed at the compression ratio of 10%, an object detection process on the image data that is compressed at the compression ratio of 30%, an object detection process on the image data that is compressed at the compression ratio of 50%, and an object detection process on the image data that is compressed at the compression ratio of 80%.

The detection processing unit 412 preferably performs the object detection process that is the same as the object detection process performed by the detection processing unit 311 of the data processing apparatus 3. The detection processing unit 412 preferably performs the object detection process that conforms to the object detection method that is the same as the object detection method to which the object detection process performed by the detection processing unit 311 conforms. When the detection processing unit 311 performs the object detection process by using a predetermined arithmetic model (e.g., an arithmetic model that employs a neural network), the detection processing unit 412 preferably performs the object detection process by using the arithmetic model that is the same as the arithmetic model used by the detection processing unit 311.

Figure 9:
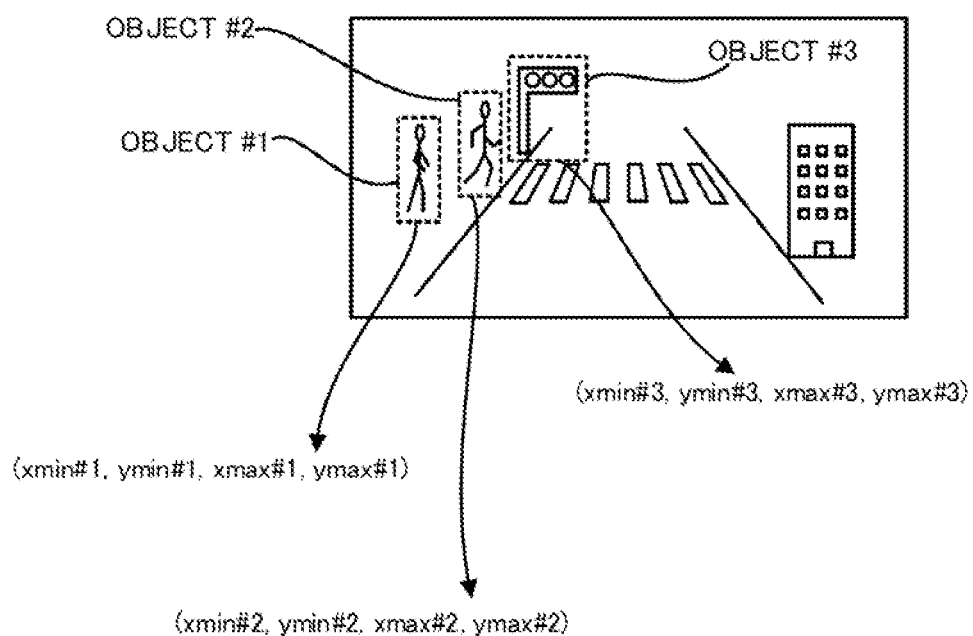
FIG. 9 is a plan view illustrating an image that includes a plurality of objects.

The result of the object detection process may include a position (hereinafter referred to as an "object detection position") at which the object that is included in the image represented by the image data is detected in the image. Hereinafter, for convenience of explanation, in the example embodiment, a description will be given by using an example in which the result of the object detection process is the object detection position. The object detection position may include, for example, coordinates (a coordinate value in a two-dimensional coordinate system) of an area in which an object is detected in the image (e.g., a rectangular area that includes the object, a so-called box). For example, FIG. 9 illustrates that an object #1 corresponding to a human, an object #2 corresponding to a human, and an object #3 corresponding to a traffic light are included in an image represented by the image data. In this case, the result of the object detection process may include the minimum coordinates (e.g., coordinates of a lower left vertex in FIG. 9, (xmin #1, ymin #1)) and the maximum coordinates (e.g., coordinates of a upper right vertex in FIG. 9, (xmax #1, ymax #1)) of a rectangular area that includes the object #1, the minimum coordinates (xmin #2, ymin #2) and the maximum coordinates (xmax #2, ymax #2) of a rectangular area that includes the object #2, and the minimum coordinates (xmin #3, ymin #3) and the maximum coordinates (xmax #3, ymax #3) of a rectangular area that includes the object #3. The result of the object detection process may be temporarily stored in the storage apparatus 42 in a state of being associated with the compression ratio used when compressing the image data on which the object detection process is performed.

Figure 10:
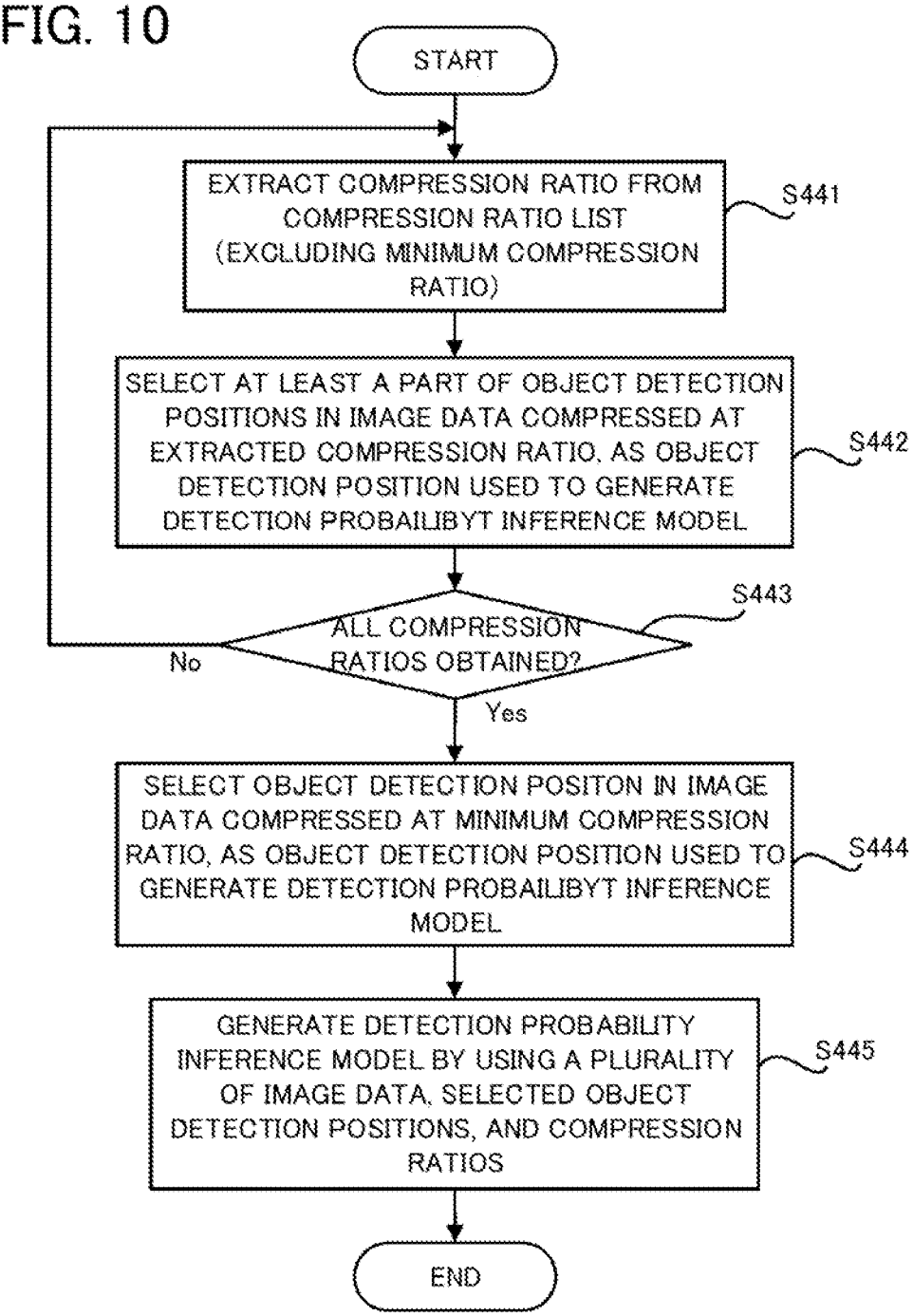
FIG. 10 is a flowchart illustrating a flow of a process of generating a detection probability inference model in a step S44 in FIG. 6.

Back in FIG. 6 again, after the object detection process is performed on each of the plurality of image data compressed, the model generation unit 413 generates the detection probability inference model 221 by using the plurality of compression ratios used by the data compression unit 411 to compress the image data and the result of the object detection process performed by the detection processing unit 412 (step S44). Hereinafter, with reference to FIG. 10, a flow of the object detection process performed in the step S44 will be described. FIG. 10 is a flowchart illustrating a flow of a process of generating the detection probability inference model 221 performed in the step S44 in FIG. 6.

As illustrated in FIG. 10, the model generation unit 413 extracts one compression ratio from the compression ratio list 422 stored in the storage apparatus 42 (step S441). In the stepped S441, however, the model generation unit 413 may not extract the minimum (i.e., smallest) compression ratio of the plurality of compression ratios included in the compression ratio list 422.

Then, the model generation unit 413 selects at least a part of the result of the object detection process performed on the image data compressed at the compression ratio extracted in the step S441 (step S442). That is, the model generation unit 413 selects at least a part of a plurality of object detection positions detected from the image data compressed at the compression ratio extracted in the step S441 (step S442). The object detection position selected in the step S442 is actually used to generate the detection probability inference model 221. On the other hand, the object detection position that is not selected in the step S442 is preferably not actually used to generate the detection probability inference model 221.

In order to select at least a part of the result of the object detection process performed on the image data compressed at the compression ratio extracted in the step S441, the model generation unit 413 may compare the result of the object detection process performed on the image data compressed at the minimum compression ratio with the result of the object detection process performed on the image data compressed at the compression ratio extracted in the step S441. That is, the model generation unit 413 may compare a plurality of object detection positions detected from the image data compressed at the minimum compression ratio (hereinafter, referred to as "object detection positions (reference)" for convenience of explanation) with a plurality of object detection positions detected from the image data compressed at the compression ratio extracted in the step S441 (hereinafter, referred to as "object detection positions (selection candidate)" for convenience of explanation).

Specifically, the model generation unit 413 selects an object detection position (selection candidate) that is coincident with at least one of a plurality of object detection positions (reference). Here, when there is an object detection position (selection candidate) that is coincident with at least one object detection position (reference), it is considered that the same object as the object detected from the image data compressed at the minimum compression ratio is also detected from the image data compressed at the compression ratio extracted in the step S441. Therefore, the reliability of the object detection position (selection candidate) that is coincident with at least one object detection position (reference) is considered to be relatively high. This is because the result of object detection process performed on the image data compressed at the minimum compression ratio is the most reliable. Thus, the operation of selecting the object detection position (selection candidate) that is coincident with at least one of the plurality of object detection positions (reference) may be considered to be substantially equivalent to an operation of selecting the object detection position (selection candidate) that is relatively reliable.

On the other hand, the model generation unit 413 does not select the object detection position (selection candidate) that is not coincident with any of the plurality of object detection positions (reference). Here, when there is the object detection position (selection candidate) that is not coincident with any of the plurality of object detection positions (reference), it is considered that the object that is not detected from the image data compressed at the minimum compression ratio is detected from the image data compressed at the compression ratio extracted in the step S441. In this case, considering that the result of the object detection process performed on the image data compressed at the minimum compression ratio is the most reliable, the reliability of the object detection position (selection candidate) that is not coincident with any of the plurality of object detection positions (reference) is considered to be relatively low. Typically, it is considered that the object detection position (selection candidate) that is not coincident with any of the plurality of object detection positions (reference) may be the object detection position (selection candidate) that is incorrectly detected. Accordingly, the operation of not selecting the object detection position (selection candidate) that is not coincident with any of the plurality of object detection positions (reference) may be considered to be substantially equivalent to an operation of eliminating the object detection position (selection candidate) that is relatively unreliable.

As described above, in the step S442, the model generation unit 413 selects the relatively reliable object detection position (selection candidate) as the object detection position that is actually used to generate the detection probability inference model 221. On the other hand, the model generation unit 413 does not select the relatively unreliable object detection position (selection candidate) as the object detection position that is actually used to generate the detection probability inference model 221. As a result, the detection probability inference model 221 is generated on the basis of the relatively reliable object detection position, and thus, the reliability of the detection probability inference model 221 is also relatively high. That is, the inference accuracy of the detection probability inference model 221 is relatively high.

The process from the step S441 to the step S442 described above is repeated until all the plurality of compression ratios included in the compression ratio list 422 (excluding the minimum compression ratio) are extracted in the step S441 (step S443). For example, as the plurality of compression ratios, if the compression ratio list 422 includes four types of compression ratios of "10%", "30%", "50%" and "80%", the model generation unit 413 compares a plurality of object detection positions (selection candidates) detected from the image data compressed at a compression ratio of 30% with a plurality of object detection positions (reference) detected from the image data compressed at a compression ratio of 10%, thereby to select at least a part of the plurality of object detection positions (selection candidates) detected from image data compressed at a compression ratio of 30%. In the same manner, the model generation unit 413 compares a plurality of object detection positions (selection candidates) detected from the image data compressed at a compression ratio of 50% with a plurality of object detection positions (reference) detected from the image data compressed at a compression ratio of 10%, thereby to select at least a part of the plurality of object detection positions (selection candidates) detected from the image data compressed at a compression ratio of 50%. In the same manner, the model generation unit 413 compares a plurality of object detection positions (selection candidates) detected from the image data compressed at a compression ratio of 80% with a plurality of object detection positions (reference) detected from the image data compressed at a compression ratio 10%, thereby to select at least a part of the plurality of object detection positions (selection candidates) detected from the image data compressed at a compression ratio of 80%.

Then, the model generation unit 413 selects each of the plurality of object detection positions (reference) detected from the image data compressed at the minimum compression ratio, as the object detection position that is actually used to generate the detection probability inference model 221 (step S444). This is because, as described above, the result of object detection process performed on the image data compressed at the minimum compression ratio is the most reliable.

The object detection position selected in each of the steps S442 and S444 may be temporarily stored in the storage apparatus 42 in a state of being associated with the compression ratio of the image data that is a detection source of the object detection position, as illustrated in FIG. 11. Specifically, label data 423, which includes the object detection position selected in each of the steps S442 and S444 and the compression ratio of the image data that is the detection source of the object detection position, may be stored in the storage apparatus 42 by the number of the selected object detection positions. For example, in an example illustrated in FIG. 11, the storage apparatus 42 stores the label data 423 that includes the object detection position (xmin #1, ymin #1, xmax #1, ymax #1) of the object #1 illustrated in FIG. 9 and the compression ratio of 10%, the label data 423 that includes the object detection position (xmin #1, ymin #1, xmax #1, ymax #1) of the object #1 and the compression ratio of 30%, and the label data 423 that includes the object detection position (xmin #1, ymin #1, xmax #1, ymax #1) of the object #1 and the compression ratio of 50%. In this case, it can be seen that the object #1 is detected from the image data compressed at compression ratios of 10%, 30% and 50%, but it is not detected from the image data compressed at a compression ratio of 80%. In the same manner, for example, in the example illustrated in FIG. 11, the storage apparatus 42 stores the label data 423 that includes the object detection position (xmin #2, ymin #2, xmas #2, ymax #2) of the object #2 illustrated in FIG. 9 and the compression ratio of 10%, and the label data 423 that includes the object detection position (xmin #2, ymin #2, xmas #2, ymax #2) of the object #2 and the compression ratio of 30%. In this case, it can be seen that the object #2 is detected from the image data compressed at compression ratios of 10% and 30%, but it is not detected from the image data compressed at compression ratios of 50% and 80%.

Thereafter, the model generation unit 413 generates the detection probability inference model 221 on the basis of the plurality of image data obtained from the learning dataset 421 in the step S41 in FIG. 6 and all the label data 423 that includes the object detection positions and the compression ratios stored in the storage apparatus 42 (step S445).

The detection probability inference model 221 may be an arithmetic model for outputting, for each compression ratio, a probability of detecting an object that is inferred to be included at a certain position in an image represented by one image data, by the object detection process, when the one image data is inputted to the detection probability inference model 221.

That is, the detection probability inference model 221 may be an arithmetic model for outputting each of the following probabilities illustrated in (1) to (N) with respect to N types of compression ratios (wherein N is an integer of 2 or more):

(1) the probability of detecting the object that is inferred to be included at a certain position in the image represented by one image data when the object detection process is performed on the one image data compressed at a first compression ratio;

(2) the probability of detecting the object that is inferred to be included at a certain position in the image represented by the one image data when the object detection process is performed on the same one image data compressed at a second compression ratio, which is different from the first compression ratio; and so on;

(N−1) the probability of detecting the object that is inferred to be included at a certain position in the image represented by the one image data when the object detection process is performed on the same one image data compressed at an (N−1)-th compression ratio, which is different from the first to (N−2)-th compression ratios; and (N) the probability of detecting the object that is inferred to be included at a certain position in the image represented by the one image data when the object detection process is performed on the same one image data compressed at an N-th compression ratio, which is different from the first to (N−1)-th compression ratios.

Figure 12:
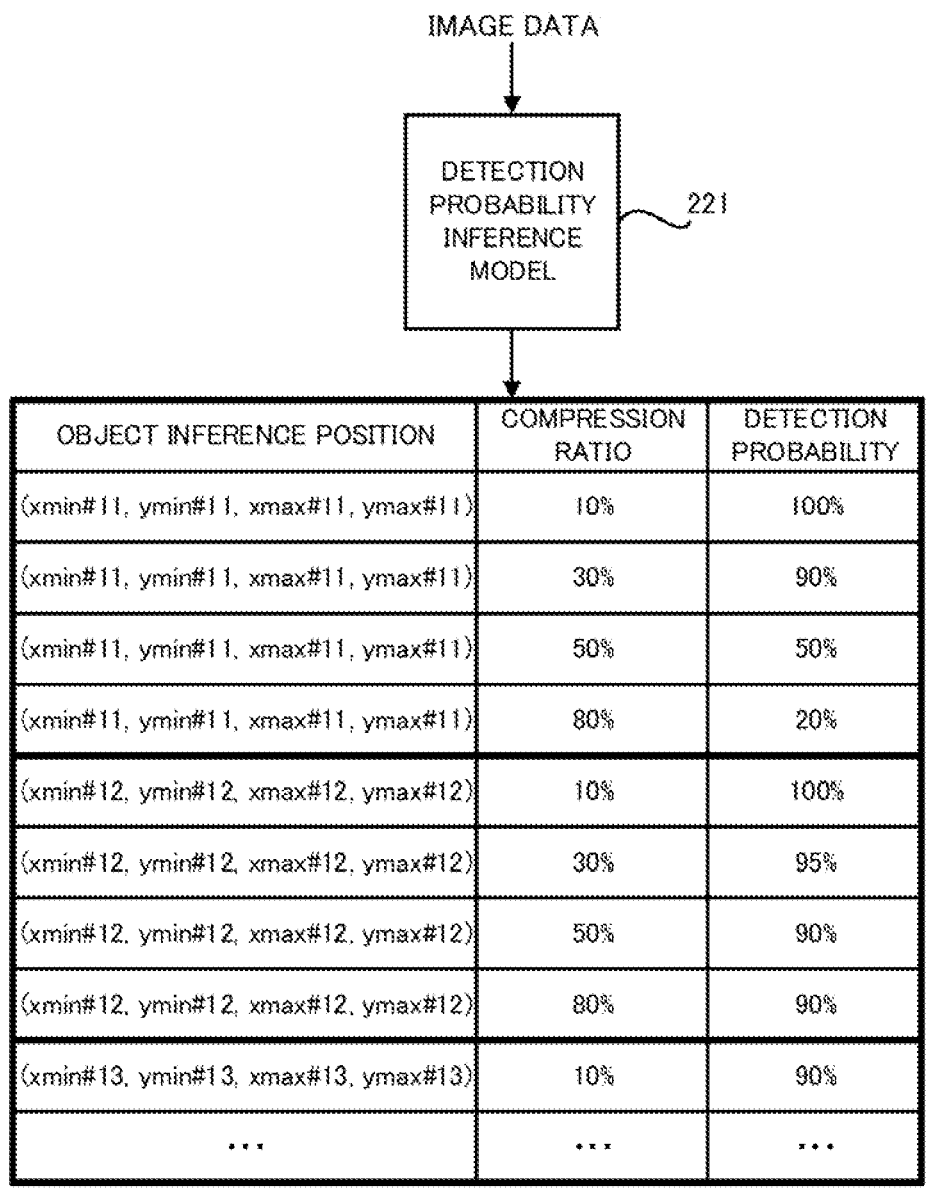
FIG. 12 is an explanatory diagram conceptually illustrating an output of the detection probability inference model.

More specifically, for example, an example illustrated in FIG. 12 indicates that the output of the detection probability inference model 221 in which certain image data is inputted is as follows:

(1-1) when the object detection process is performed on one image data compressed at a compression ratio of 10%, a probability of detecting an object #11 that is inferred to be included at an object inference position (xmin #11, ymin #11, xmax #11, ymax #11) is 100%;

(1-2) when the object detection process is performed on one image data compressed at a compression ratio of 30%, the probability of detecting the object #11 that is inferred to be included at the object inference position (xmin #11, ymin #11, xmax #11, ymax #11) is 90%;

(1-3) when the object detection process is performed on one image data compressed at a compression ratio of 50%, the probability of detecting the object #11 that is inferred to be included at the object inference position (xmin #11, ymin #11, xmax #11, ymax #11) is 50%;

(1-4) when the object detection process is performed on one image data compressed at a compression ratio of 80%, the probability of detecting the object #11 that is inferred to be included at the object inference position (xmin #11, ymin #11, xmax #11, ymax #11) is 20%;

(2-1) when the object detection process is performed on one image data compressed at a compression ratio of 10%, a probability of detecting an object #12 that is inferred to be included at an object inference position (xmin #12, ymin #12, xmax #12, ymax #12) is 100%;

(2-2) when the object detection process is performed on one image data compressed at a compression ratio of 30%, the probability of detecting the object #12 that is inferred to be included at the object inference position (xmin #12, ymin #12, xmax #12, ymax #12) is 95%;

(2-3) when the object detection process is performed on one image data compressed at a compression ratio of 50%, the probability of detecting the object #12 that is inferred to be included at the object inference position (xmin #12, ymin #12, xmax #12, ymax #12) is 90%;

(2-4) when the object detection process is performed on one image data compressed at a compression ratio of 80%, the probability of detecting the object #12 that is inferred to be included at the object inference position (xmin #12, ymin #12, xmax #12, ymax #12) is 90%; and (3-1) when the object detection process is performed for one image data compressed at a compression ratio of 10%, a probability of detecting an object #13 that is inferred to be included at an object inference position (xmin #13, ymin #13, xmax #13, ymax #13) is 90%.

Such a detection probability inference model 221 may be, for example, an arithmetic model using a neural network. In this case, the model generation unit 413 may generate the detection probability inference model 221 by allowing the detection probability inference model 221 to learn the plurality of image data, the object detection position, and the compression ratio.

Here, as described above, the object detection process performed by the model generation apparatus 4 is the same as the object detection process performed by the data processing apparatus 3. Therefore, it can be said that the detection probability inference model 221 generated on the basis of the result of the object detection process performed by the model generation apparatus 4 is substantially an arithmetic model for outputting, for each compression ratio, a probability of detecting an object (referred to as an object I in this paragraph) that is inferred to be included at a certain position in an image represented by one image data, by the data processing apparatus 3, when the one image data is inputted to the data processing apparatus 3. It can be also said that the probability of detecting the object I is substantially equivalent to the accuracy of detecting the object I, because it can be said that the higher the probability of detecting the object I is, the higher the accuracy of detecting the object I is. Therefore, it can be also said that the detection probability inference model 221 is an arithmetic model for outputting, for each compression ratio, a detection accuracy of an object that is inferred to be included at a certain position in an image represented by one image data and that is detected by the data processing apparatus 3, when the one image data is inputted to the data processing apparatus 3. Thus, it can be said that the detection probability inference model 221 is an arithmetic model for outputting an accuracy information regarding a relationship between the compression ratio for compressing the image data and the detection accuracy of the object detected by the object detection process performed by using the compressed image data.

Back in FIG. 6 again, after the detection probability inference model 221 is generated, the transmission control unit 414 transmits the detection probability inference model 221 generated in the step S44 to the data processing apparatus 3 by using the communication apparatus 43 (step S45).

<2-2> Data Compression Operation

Figure 13:
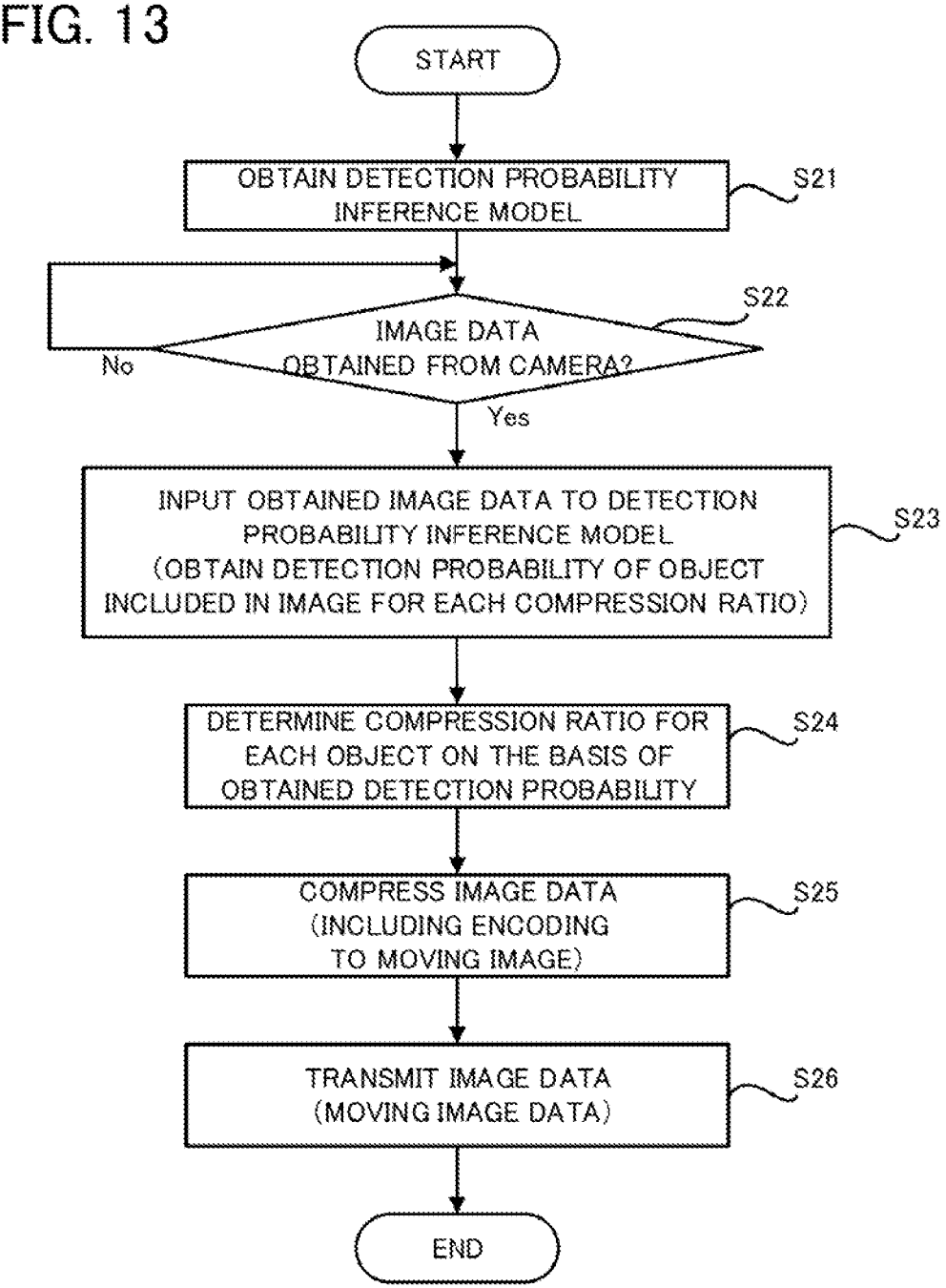
FIG. 13 is a flowchart illustrating a flow of a data compression operation performed by the data compression apparatus.

Next, with reference to FIG. 13, a description will be given to a flow of the data compression operation performed by the data compression apparatus 2. FIG. 13 is a flowchart illustrating the flow of the data compression operation performed by the data compression apparatus 2.

As illustrated in FIG. 13, firstly, the compression ratio setting unit 211 obtains the detection probability inference model 221 from the model generation apparatus 4 by using the communication apparatus 24 (step S21). The obtained detection probability inference model 221 is stored in the storage apparatus 22. When the latest detection probability inference model 221 has been already obtained, the compression ratio setting unit 211 may not obtain the detection probability inference model 221.

Then, when the moving image data (or image data) is inputted from the camera 1 to the data compression apparatus 2 through the input/output IF 23 (step S22), the data compression apparatus 2 compresses the moving image data inputted to the data compression apparatus 2 (step S23 to step S25). In other words, the data compression apparatus 2 compresses the image data that constitutes the moving image data inputted to the data compression apparatus 2.

Specifically, firstly, the compression ratio setting unit 211 inputs the image data obtained in the step S22 to the detection probability inference model 221 obtained in the step S21 (step S23). As a result, the compression ratio setting unit 211 obtains the probability that each object which is inferred to be included in the image represented by the image data is detected by the data processing apparatus 3, for each compression ratio of the image data obtaining, when the image data obtained in step S22 is inputted to the data processing apparatus 3 (step S23).

Then, the compression ratio setting unit 211 sets the compression ratio of the image data on the basis of the detection probability for each compression ratio obtained in the step S23 (step S24). Specifically, the detection probability inference model 221 also outputs the position of the object that is included in the image represented by the image data as described above (the object inference position), in addition to the detection probability for each compression ratio obtained by the compression ratio setting unit 211 in the step S23. Thus, an area where the object is inferred to be included in the image included by the image data and an area where the object is inferred not to be included in the image represented by the image data is distinguishable from each other by the compression ratio setting unit 211, on the basis of the object inference position outputted by the detection probability inference model 221.

Here, it can be said that the area where the object is inferred not to be included in the image represented by the image data is an area of relatively low importance to the object detection process performed by the data processing apparatus 3. Thus, even when a data part of the image data relating to the area where the object is inferred not to be included is compressed at a relatively high compression ratio, the object detection process of the data processing apparatus 3 is relatively unlikely influenced. Therefore, the compression ratio setting unit 211 sets the compression ratio used to compress the data part relating to the area where the object of the image data is inferred not to be included, to be relatively high. For example, the compression ratio setting unit 211 may set the compression ratio used to compress the data part of the image data relating to the area where the object is inferred not to be included, to the allowable maximum (i.e., highest) compression ratio. For example, the compression ratio setting unit 211 may set the compression ratio used to compress the data part of the image data relating to the area where the object is inferred not to be included, to be lower than the compression ratio used to compress the data part of the image data relating to the area where the object is inferred to be included.

On the other hand, it can be said that the area where the object is inferred to be included in the image represented by the image data is an area of relatively high importance to the object detection process performed by the data processing apparatus 3. Therefore, the compression ratio setting unit 211 sets the compression ratio used to compress the data part of the image data relating to the area where the object is inferred to be included on the basis of the detection probability for each compression ratio obtained in the step S23. Hereinafter, an example of an operation for setting the compression ratio will be described with reference to FIG. 14.

Figure 14:
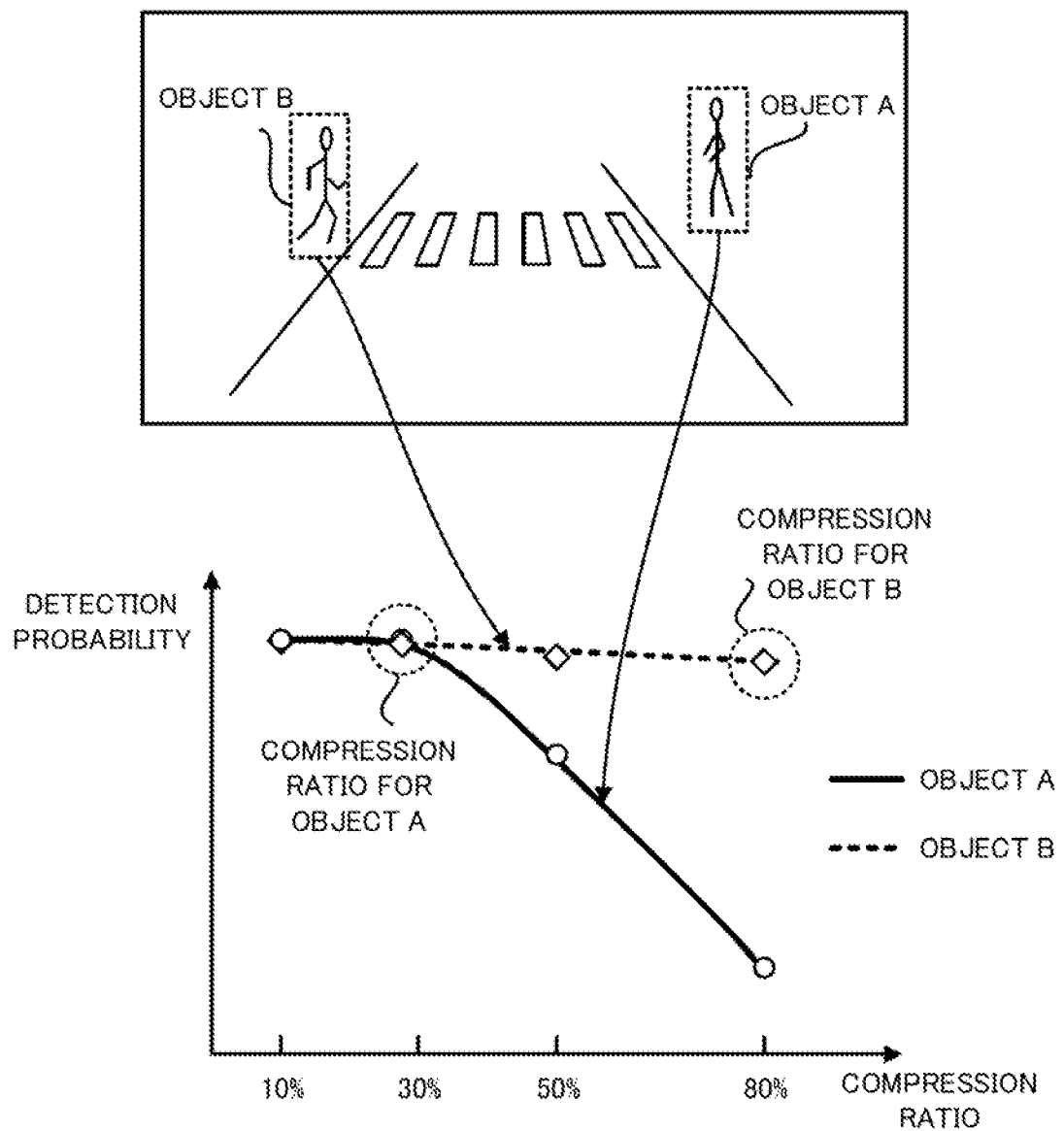
FIG. 14 is a graph illustrating a relationship between a detection probability of an object and a compression ratio of image data.

An upper part of FIG. 14 illustrates an example in which an object A and an object B are included in an image represented by the image data obtained in the step S22 in FIG. 13. In this case, the detection probability inference model 221 outputs a probability of detecting the object A for each compression ratio of the image data, together with the object inference position relating to the object A. Furthermore, the detection probability inference model 221 outputs a probability of detecting the object B for each compression ratio of the image data, together with the object inference position relating to the object B. As a result, the compression ratio setting unit 211 recognizes a correlation between the compression ratio of the image data and the detection probability of the object (i.e., the detection accuracy) for each object, as illustrated in a lower part of FIG. 14. The compression ratio setting unit 211 sets the compression ratio that is used to compress the data part of the image data relating to the area where each object is inferred to be included, on the basis of the correlation between the compression ratio of the image data and the detection probability of the object.

For example, the compression ratio setting unit 211 may set a compression ratio that is used to compress a data part AP of the image data relating to an area where the object A is inferred to be included and a compression ratio that is used to compress a data part BP of the image data relating to an area where the object B is inferred to be included so as to satisfy such a condition that the sum of a data size of the data part AP and a data size of the data part BP is less than or equal to an allowable size, and such a condition that the sum of the detection probability of the object A and the detection probability of the object B is larger than or equal to an allowable probability. For example, the compression ratio setting unit 211 may set the compression ratio that is used to compress the data part AP and the compression ratio that is used to compress the data part BP so as to maximize the sum of the detection probability of the object A and the detection probability of the object B while satisfying such a constraint that the sum of the data size of the data part AP and the data size of the data part BP is less than or equal to the allowable size. In the example illustrated in FIG. 14, the compression ratio setting unit 211 sets the compression ratio that is used to compress the data part AP relating to the object A the detection probability of which decreases relatively abruptly as the compression ratio increases to be relatively small, and sets the compression ratio that is used to compress the data part BP relating to the object B the detection probability of which does not decreases relatively abruptly even when the compression ratio increases to be relatively large.

In other words, when M objects (wherein M is an integer of 1 or more) are inferred to be included in the image represented by the image data, the compression ratio setting unit 211 may set the compression ratios that are used to compress data parts relating to M areas where the M objects are inferred to be included so as to satisfy such a condition that a data size of the data parts of the image data relating to the M areas where the M objects are inferred to be included is less than or equal to the allowable size, and such a condition that the sum of the detection probabilities of the M objects is larger than or equal to the allowable probability (i.e., is larger than or equal to an allowable accuracy). Typically, the compression ratio setting unit 211 may set the compression ratios that area used to compress the data parts relating to the M areas where the M objects are inferred to be included so as to maximize the sum of the detection probabilities of the M objects while satisfying such a constraint that the data size of the data parts of the image data relating to the M areas where the M objects are inferred to be included is less than or equal to the allowable size.

The allowable size may be set on the basis of a bandwidth (so-called available bandwidth) of the communication network 5 that is available to the data compression apparatus 2 to transmit the compressed image data (i.e., the moving image data including the compressed image data). In this case, the allowable size is a size based on a data rate of the data that can be transmitted by using the available bandwidth of the communication network 5. Typically, the allowable size is a size of the image data that can be transmitted by using the available bandwidth of the communication network 5. In this case, the compression ratio setting unit 211 may set the compression ratios that are used to compress the data parts relating to the M areas where the M objects are inferred to be included so as to satisfy such a condition that the compressed image data (or moving image data) is transmitted within the limit of the available bandwidth of the communication network 5, and such a condition that the sum of the detection probabilities of the M objects is larger than or equal to the allowable probability. Typically, the compression ratio setting unit 211 may set the compression ratios that are used to compress the data parts relating to the M areas where the M objects are inferred to be included so as to maximize the sum of the detection probabilities of the M objects while satisfying such a constraint that the compressed image data (or moving image data) is transmitted within the limit of the available bandwidth of the communication network 5.

Back in FIG. 13 again, after that, the data compression unit 212 compresses the image data obtained in the step S22 at the compression ratio determined in the step S24 (step S25). At this time, if necessary, the data compression unit 212 may perform an encoding process for generating the moving image data from the compressed image data.

Then, the transmission control unit 213 transmits the image data compressed in the step S25 (i.e., the compressed moving image data including the image data compressed in the step S25) to the data processing apparatus 3 by using the communication apparatus 24 (step S26).

<3> Technical Effects of SYS Data Compression System

As described above, according to the data compression system SYS in the present example embodiment, the data compression apparatus 2 is configured to set the compression ratio of the image data on the basis of the correlation between the detection probability of the object by the data processing apparatus 3 and the compression ratio of the image data (e.g., the correlation illustrated in FIG. 14 and the output of the detection probability inference model 221). Therefore, the data compression apparatus 2 is allowed to appropriately compress the image data when the object detection process is performed on the compressed image data. In other words, the data compression apparatus 2 is allowed to compress the image data in an appropriate compression aspect that takes into account characteristics of the object detection process performed by the data processing apparatus 3.

For example, the data compression apparatus 2 is allowed to appropriately compress the image data so that the detection probability (i.e., detection accuracy) of the object detected by the data processing apparatus 3 is relatively high. For example, the data compression apparatus 2 is allowed to appropriately compress the image data so that the data size of the image data is relatively small and the detection probability of the object by the data processing apparatus 3 is relatively high. For example, the data compression apparatus 2 is allowed to appropriately compress the image data so that the data size of the image data is reduced to an extent that the image data can be appropriately transmitted from the data compression apparatus 2 to the data processing apparatus 3 through the communication network 5 and the probability of detection of the object by the data processing apparatus 3 is relatively high.

Moreover, the data compression apparatus 2 is configured to set the compression ratios of a plurality of data parts of the image data respectively corresponding to a plurality of objects, on the basis of the detection probabilities of the plurality of objects that are inferred to be included in the image represented by the image data. Therefore, the data compression apparatus 2 is allowed to appropriately compress the image data so that the detection probabilities (i.e., detection accuracy) of the plurality of objects detected by the data processing apparatus 3 are relatively high.

Moreover, the data compression apparatus 2 is configured to easily obtain (i.e., infer) the detection probability of the object that is referred to set the compression ratio, by using the detection probability inference model 221. Therefore, the data compression apparatus 2 is allowed to relatively easily infer the characteristics of the object detection process performed by the data processing apparatus 3 and to compress the image data in an appropriate compression aspect that takes into account the inferred characteristics of the object detection process.

<4> Modified Examples

Next, modified examples of the data compression system SYS will be described. In the following, the components already described will carry the same reference numerals, and a detailed description thereof will be omitted. In the same manner, the process already described will carry the same step number, and a detailed description thereof be omitted.

<4-1> First Modified Example

In the above described description, the model generation apparatus 4 (especially, the model generation unit 413) generates the detection probability inference model 221 by using all of the label data 423 including the object detection position and the compression ratio stored in the storage apparatus 42. On the other hand, in a first modified example, the model generation unit 413 may not use a part of the label data 423 including the object detection position and the compression ratio stored in the storage apparatus 42 to generate the detection probability inference model 221.

Specifically, FIG. 15 illustrates an example of the plurality of label data 423 including the object detection position and the compression ratio. In the first modified example, when there are at least two label data 423 including the same object detection position, the model generation unit 413 generates the detection probability inference model 221 by using a single label data 423 having the maximum compression ratio that is included in the label data 423. On the other hand, the model generation unit 413 may not use a label data 423 that does not have the maximum compression ratio that is included in the label data 423 to generate the detection probability inference model 221.

For example, in the example illustrated in FIG. 15, there are three label data 423 including the object detecting position (xmin #1, ymin #1, xmax #1, ymax #1) of the object #1 illustrated in FIG. 9. In this case, a compression ratio of 50% is the maximum compression ratio among three compression ratios respectively included in the three label data 423. Thus, a label data 423 of the three label data 423 that includes the compression ratio of 50% may be used to generate the detection probability inference model 221, and two of the three label data 423 that respectively include a compression ratio of 10% and a compression ratio of 30% may not be used to generate the detection probability inference model 221. As a result, in the first modified example, the model generation unit 413 generates the detection probability inference model 221, by using a plurality of label data 423 illustrated in FIG. 16 that satisfies such a condition that there is only one label data 423 including the same object detection position, in place of the plurality of label data 423 illustrated in FIG. 15. As a result, a processing load for generating the detection probability inference model 221 is reduced.

In the first modified example, the detection probability inference model 221 may be an arithmetic model for outputting the probability of detecting an object, which is inferred to be included at a certain position in the image represented by one image data, by the object detection process, when the one image data is inputted to the detection probability inference model 221, together with a compression ratio at which the object is detected for the first time.

That is, in the first modified example, the detection probability inference model 221 may be an arithmetic model for outputting each of the following probabilities illustrated in (1) to (N) below with respect to L types of compression ratios (wherein L is an integer of 2 or more):

(1) the probability of detecting the object for the first time when the object detection process is performed on one image data compressed at a compression ratio that is in a first range, while no object is detected when the object detection process is performed on one image data compressed at a compression ratio that is larger than the compression ratio that is in the first range;

(2) the probability of detecting the object for the first time when the object detection process is performed on one image data compressed at a compression ratio that is in a second range, which is different from the first range, while no object is detected when the object detection process is performed on one image data compressed at a compression ratio that is larger than the compression ratio that is in the second range, and so on;

(L−1) the probability of detecting the object for the first time when the object detection process is performed on one image data compressed at a compression ratio that is in an (L−1)-th range, while no object is detected when the object detection process is performed on one image data compressed at a compression ratio that is larger than the compression ratio that is in the first to a (L−2)-th ranges; and (L) the probability of detecting the object for the first time when the object detection process is performed on one image data compressed at a compression ratio that is in an L-th range, which is different from the first to the (L−1)-th ranges, while no object is detected when the object detection process is performed on one image data compressed at a compression ratio that is larger than the compression ratio that is in the L-th range.

Figure 17:
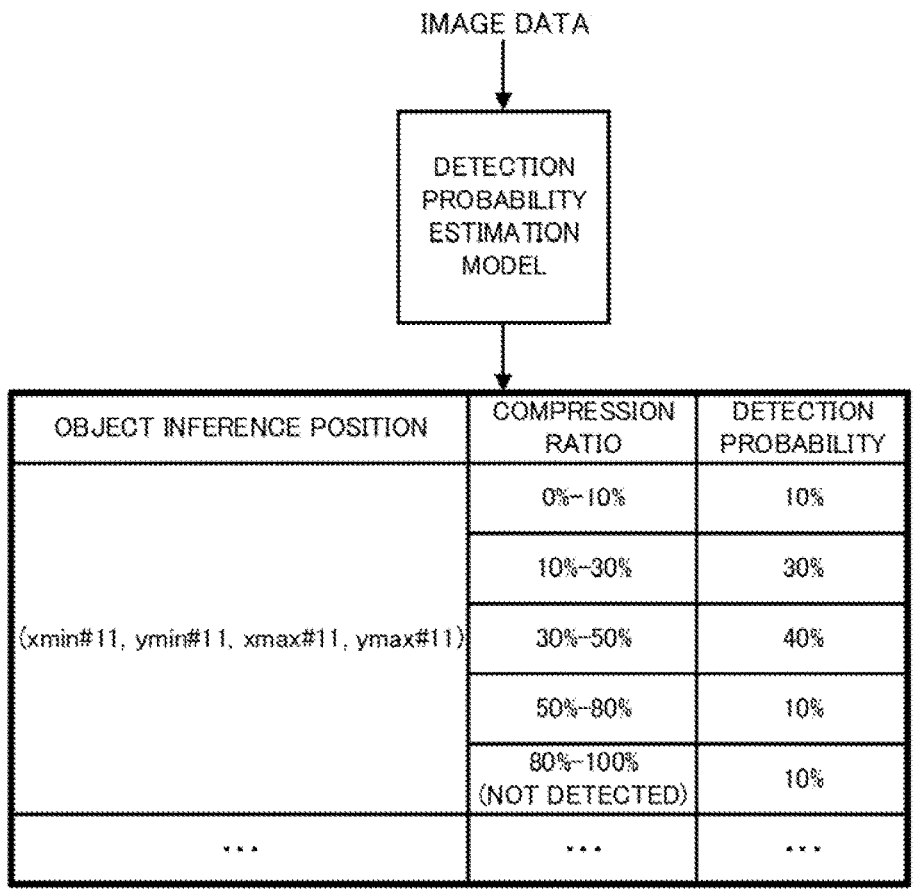
FIG. 17 is an explanatory diagram conceptually illustrating the output of the detection probability inference model in the first modified example.

More specifically, for example, an example illustrated in FIG. 17 indicates that the output of the detection probability inference model 221 to which certain image data is inputted is as follows:

(1) the probability of detecting an object that is inferred to be included at the object inference position (xmin #11, ymin #11, xmax #11, ymax #11) for the first time when the object detection process is performed on one image data compressed at a compression ratio of 0% to 10% while the object that is inferred to be included at an object inference position (xmin #11, ymin #11, xmax #11, ymax #11) is not detected when the object detection process is performed on one image data compressed at a compression ratio that is larger than 10% is 10%;

(2) the probability of detecting an object that is inferred to be included at the object inference position (xmin #11, ymin #11, xmax #11, ymax #11) for the first time when the object detection process is performed on one image data compressed at a compression ratio of 10% to 30% while the object that is inferred to be included at an object inference position (xmin #11, ymin #11, xmax #11, ymax #11) is not detected when the object detection process is performed on one image data compressed at a compression ratio that is larger than 30% is 30%;

(3) the probability of detecting an object that is inferred to be included at the object inference position (xmin #11, ymin #11, xmax #11, ymax #11) for the first time when the object detection process is performed on one image data compressed at a compression ratio of 30% to 50% while the object that is inferred to be included at an object inference position (xmin #11, ymin #11, xmax #11, ymax #11) is not detected when the object detection process is performed on one image data compressed at a compression ratio that is larger than 50% is 40%;

(4) the probability of detecting an object that is inferred to be included at the object inference position (xmin #11, ymin #11, xmax #11, ymax #11) for the first time when the object detection process is performed on one image data compressed at a compression ratio of 50% to 80% while the object that is inferred to be included at an object inference position (xmin #11, ymin #11, xmax #11, ymax #11) is not detected when the object detection process is performed on one image data compressed at a compression ratio that is larger than 80% is 10%; and (5) the probability of detecting the object that is inferred to be included at the object inference position (xmin #11, ymin #11, xmax #11, ymax #11) for the first time when the object detection process is performed on one image data compressed at a compression ratio of 80% to 100% is 10%.

Incidentally, in principle, the compression ratio that is higher than the maximum compression ratio included in the compression ratio list 422 is not used in the compression process. For this reason, the probability of detecting the object from one image data compressed at a compression ratio in a range that is larger than the maximum compression ratio included in the compression ratio list 422 may be considered to be substantially equivalent to the probability that no object is detected. For example, when the maximum compression ratio included in the compression ratio list 422 is 80%, then, the "probability of detecting the object from one image data compressed at a compression ratio of 80% to 100%" illustrated in FIG. 17 may be considered to be substantially equivalent to the "probability that no object is detected from one image data".

Figure 18:
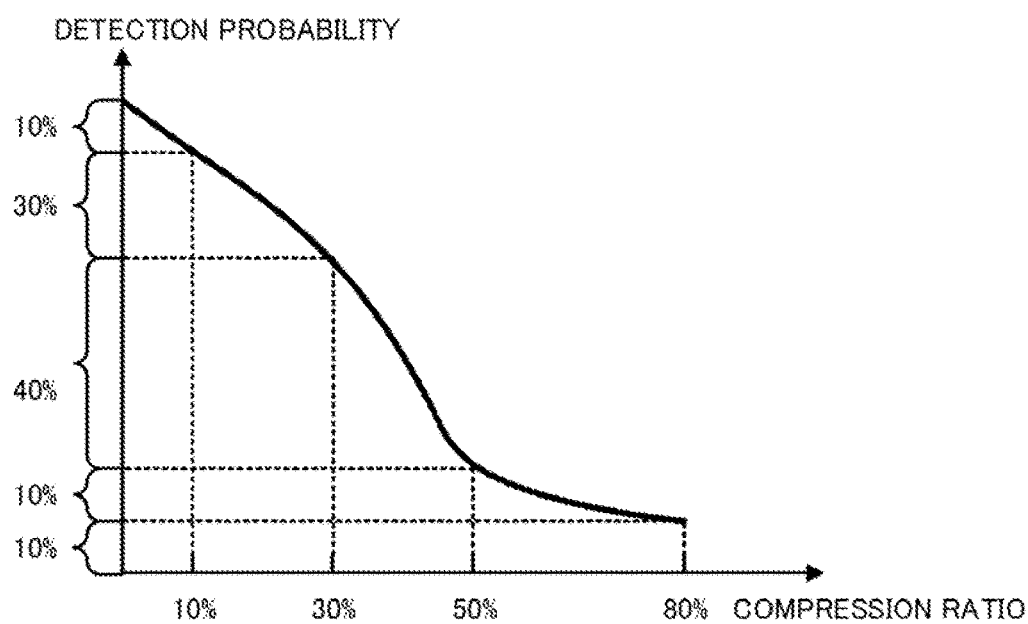
FIG. 18 is a graph illustrating the relationship between the detection probability of the object and the compression ratio of the image data in the first modified example.

Even when such a detection probability inference model 221 is generated, the compression ratio setting unit 211 is allowed to recognize the correlation between the compression ratio of the image data and the detection probability of the object (i.e., the detection accuracy) for each object, as illustrated in FIG. 18. For example, the correlation illustrated in FIG. 18 is obtained by calculating a cumulative distribution function of the detection probability illustrated in FIG. 17, excluding the "probability that no object is detected" from the calculated cumulative distribution function, and normalizing the remaining cumulative distribution function. Therefore, even in the first modified example, as in the example embodiment described above, the compression ratio is appropriately set, and as a result, the image data is appropriately compressed. That is, even in the first modified example, it is possible to achieve the same effects as those of the data compression system SYS of the present example embodiment described above.

<4-2> Second Modified Example

Figure 19:
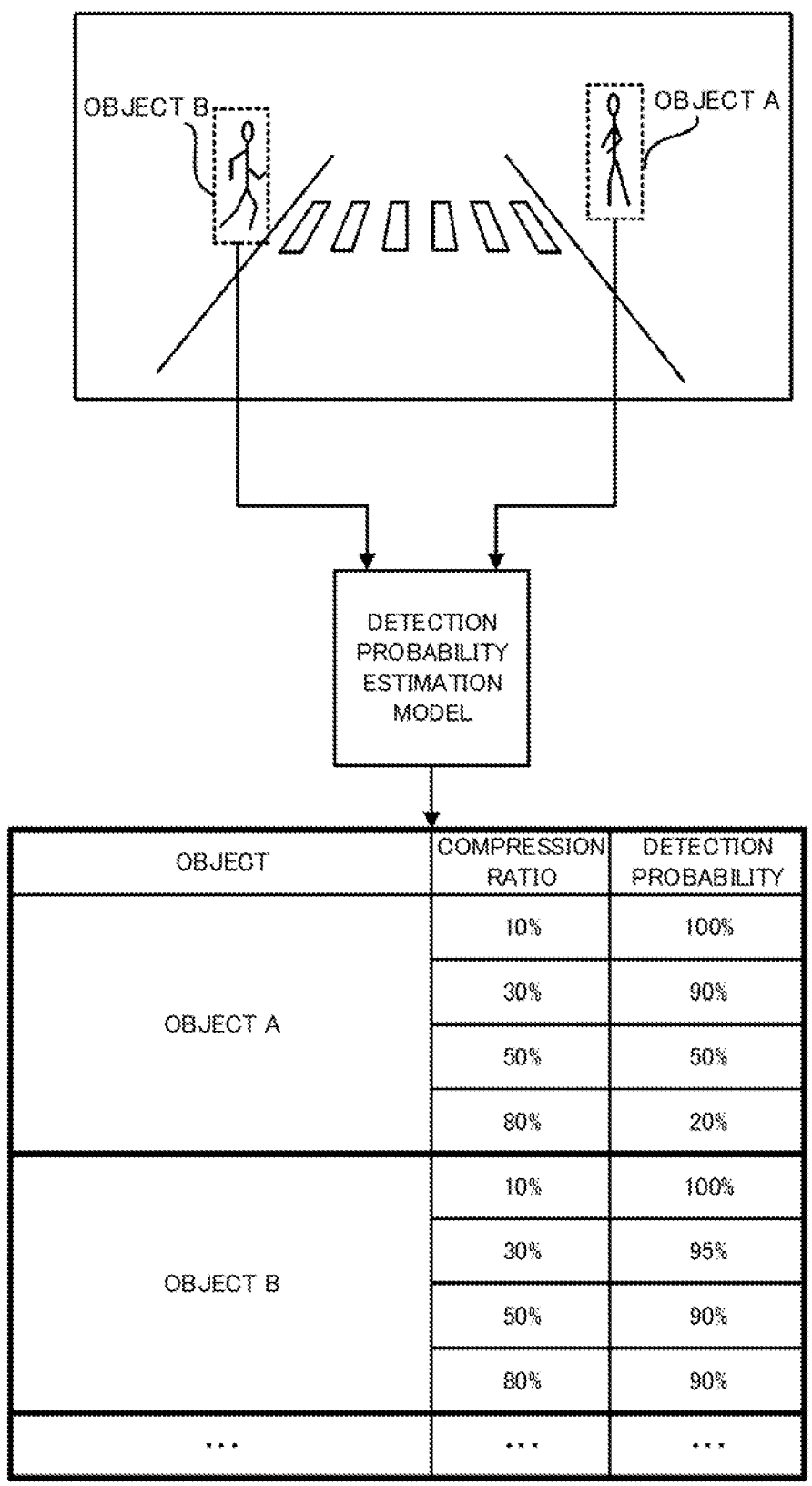
FIG. 19 is an explanatory diagram conceptually illustrating the output of the detection probability inference model in a second modified example.

In the description described above, the data compression apparatus 2 (especially, the compression ratio setting unit 211) inputs the image data obtained from the camera 1 to the detection probability inference model 221. On the other hand, in a second modified example, as illustrated in FIG. 19, the compression ratio setting unit 211 may perform the object detection process on the image data obtained from the camera 1 and may input a data part of the image data relating to the detected object to the detection probability inference model 221. Alternatively, the compression ratio setting unit 211 may perform the object detection process on the image data obtained from the camera 1 and may input information relating to the position of the object detected by the object detection process to the detection probability inference model 221, together with the image data.

Even in this case, the compression ratio setting unit 211 is allowed to recognize the correlation between the compression ratio of the image data and the detection probability of the object (i.e., detection accuracy) for each object. Therefore, even in the second modified example, as in the example embodiment described above, the compression ratio is appropriately set, and as a result, the image data is appropriately compressed. That is, even in the second modified example, it is possible to achieve the same effects as those of the data compression system SYS of the present example embodiment described above.

<4-3> Third Modified Example

In the description described above, the data compression apparatus 2 compresses the image data (or moving image data) obtained from the camera 1. Here, it can be said that the camera 1 is an example of a monitoring apparatus for monitoring the imaging range by imaging the imaging range. Thus, the data compression apparatus 2 may compress output data that is sequentially outputted as time series data by a monitoring apparatus for monitoring a predetermined monitoring target range, in addition to or in place of the image data (or moving image data) obtained from the camera 1. In this case, the monitoring apparatus is preferably a monitoring apparatus for monitoring an object that exists in the monitoring target range. Therefore, the output data outputted from the monitoring apparatus preferably includes information relating to the object that exists in the monitoring target range. Incidentally, the imaging range of the camera 1 is an example of the monitoring target range.

Figure 20:
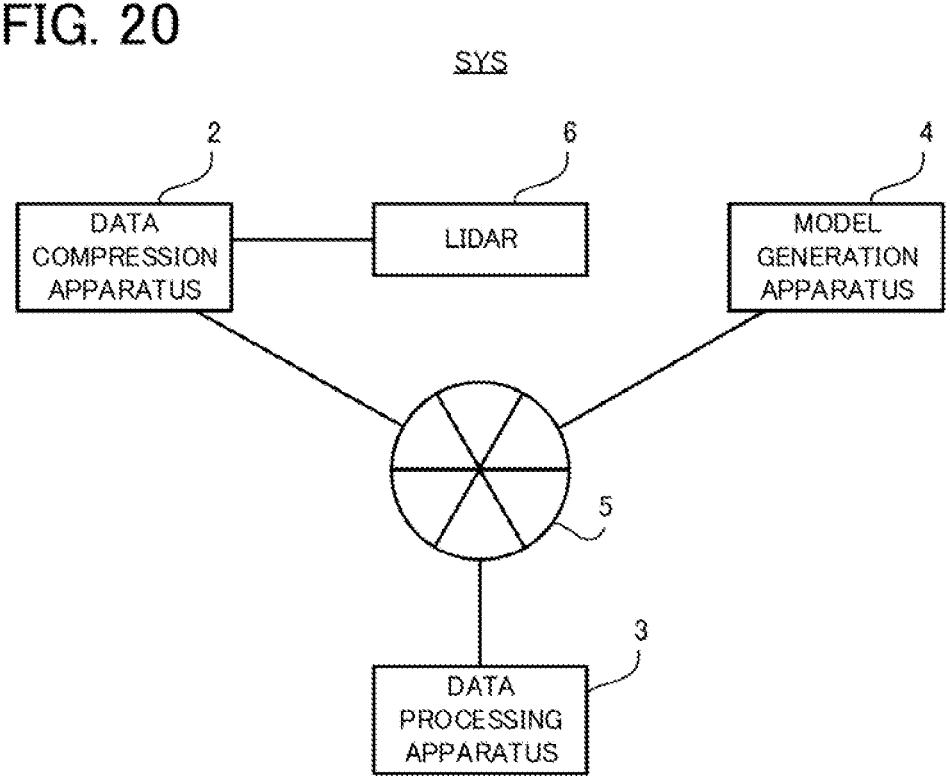
FIG. 20 is a block diagram illustrating an overall configuration of a data compression system according to a third modified example.

An example of such a monitoring apparatus may be a space monitoring apparatus for outputting point clouds data corresponding to information relating to an object that exists in a spatially extending monitoring target range by optically monitoring the monitoring target range. An example of the space monitoring apparatus is a three-dimensional scanner such as a LIDAR (Light Detection and Ranging). In this instance, as illustrated in FIG. 20, the data compression system SYS may include a LIDAR 6 in addition to or in place of the camera 1.

The data compression apparatus 2 may obtain the point clouds data from the LIDAR 6 and may compress the obtained point clouds data. At this time, as in the case in which the image data is compressed, the data compression apparatus 2 may set the compression ratio of a data part of the point clouds data relating to a space where an object is inferred to exist, on the basis of information relating to the correlation between the detection probability of the object and the compression ratio of the point clouds data. The information relating to the correlation between the detection probability of the object and the compression ratio of the point clouds data may be obtained by using the detection probability inference model 221. In the third modified example, however, the detection probability inference model 221 may be an arithmetic model for outputting, for each compression ratio of the point clouds data, a probability of detecting an object that is inferred to exist at a certain position in a space represented by one point clouds data, by the object detection process, when the one clouds group data is inputted to the detection probability inference model 221.

The data processing apparatus 3 may perform the object detection process on the point clouds data. That is, the data processing apparatus 3 may detect an object that exists in the space represented by the point clouds data.

In such a third modified example, the data compression apparatus 2 is allowed to appropriately compress the point clouds data when the object detection process is performed on the compressed point clouds data. That is, the data compression apparatus 2 is allowed to compress the point clouds data in an appropriate compression aspect that takes into account the characteristics of the object detection process performed by the data processing apparatus 3. In other words, even in the third modified example, it is possible to achieve the same effects as those of the data compression system SYS of the present example embodiment described above.

Incidentally, it can be said that the image data is data including a set of pixels (i.e., points) distributed on a two-dimensional plane. On the other hand, it can be also said that the point clouds data is data including a set of pixels (i.e., points) distributed in a three-dimensional space. Therefore, it can be said that the image data and the point clouds data are common in that they represent information relating to an object by a set of points.

<4-4> Fourth Modified Example

Figure 21:
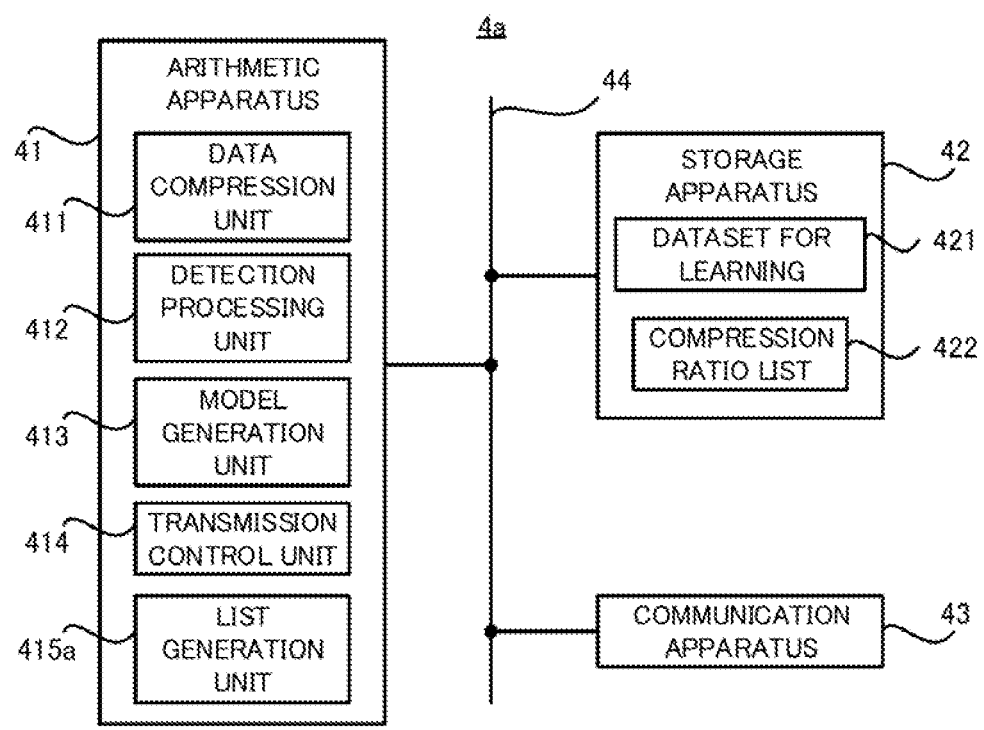
FIG. 21 is a block diagram illustrating a configuration of a model generation apparatus according to a fourth modified example.

In a fourth modified example, the data compression system SYS is provided with a model generation apparatus 4a in place of the model generation apparatus 4. As illustrated in FIG. 21, the model generation apparatus 4a differs from the model generation apparatus 4 in that a list generation unit 415a as a functional block for determining the compression ratio included in the compression ratio list 422 is realized in the arithmetic apparatus 41. The other characteristics of the model generation apparatus 4a may be the same as those of the model generation apparatus 4.

In order to determine the compression ratio included in the compression ratio list 422, the data compression unit 411 of the model generation apparatus 4a compresses at least one image data that is included in the learning dataset 421 (or at least one image data that is not included in the learning dataset 421). At this time, as illustrated in FIG. 22, the data compression unit 411 compresses the image data at each of a plurality of different compression ratio candidates, each of which is a candidate of the compression ratio to be included in the compression ratio list 422.

Then, the detection processing unit 412 of the model generation apparatus 4a performs the object detection process on the image data compressed at each of the plurality of different compression ratio candidates.

Then, when there are at least two compression ratio candidates that result in the same result of the object detection process among the plurality of different compression ratio candidates, the list generation unit 415a of the model generation apparatus 4a includes a maximum one of the at least two compression ratio candidates in the compression ratio list 422. On the other hand, the list generation apparatus 415a does not include a compression ratio candidate(s) other than the maximum one of the at least two compression ratio candidates, in the compression ratio list 422.

Figure 22:
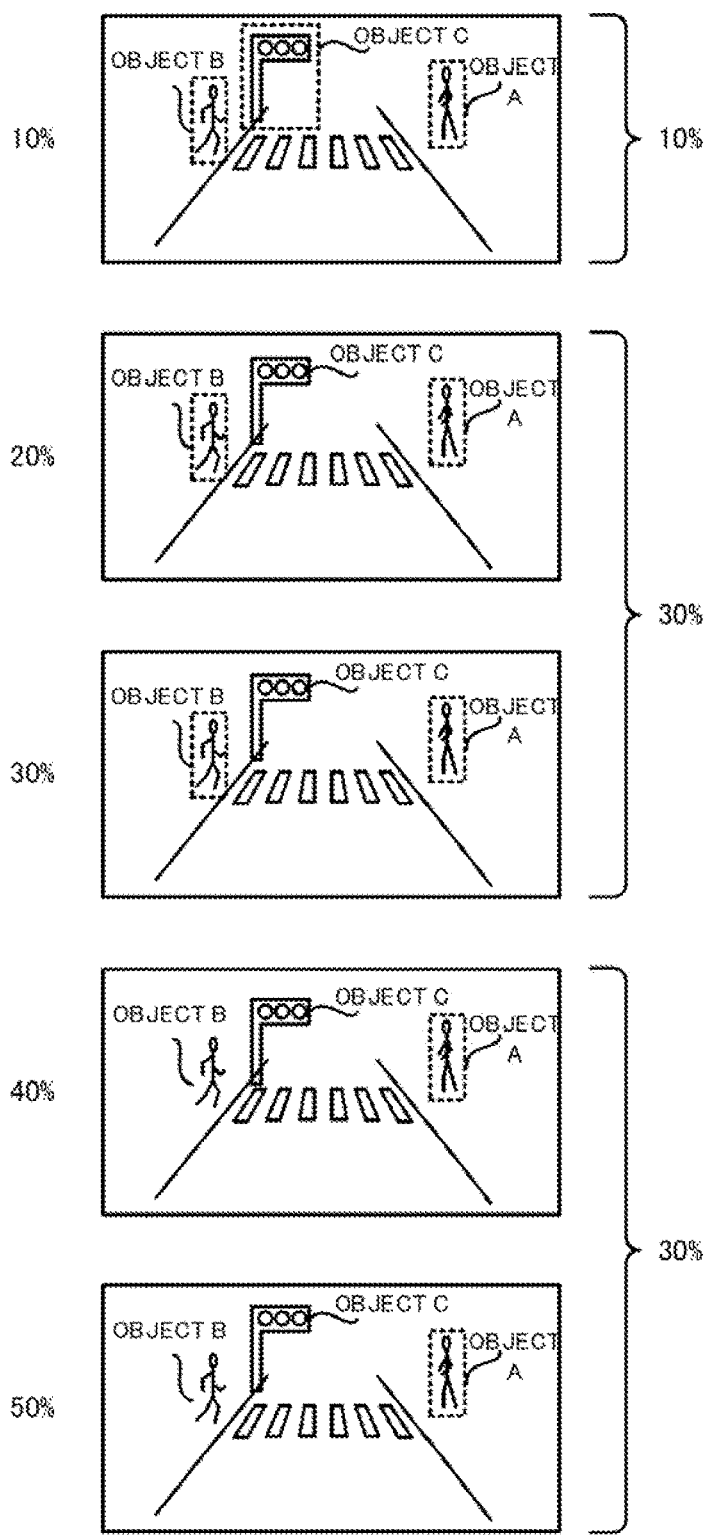
FIG. 22 is an explanatory view illustrating a relationship between a compression ratio candidate and a compression ratio included in a compression ratio list in the fourth modified example.

For example, FIG. 22 illustrates an example in which the plurality of different compression ratio candidates include 10%, 20%, 30%, 40% and 50%. Moreover, FIG. 22 illustrates the following example: an object A, an object B and an object C are detected by the object detection process performed on the image data compressed at a compression ratio candidate of 10%; the object A and the object B are detected but the object C is not detected by the object detection process performed on the image data compressed at a compression ratio candidate of 20%; the object A and the object B are detected but the object C is not detected by the object detection process performed on the image data compressed at a compression ratio candidate of 30%; the object A is detected but the object B and the object C are not detected by the object detection process performed on the image data compressed at a compression ratio candidate of 40%; and the object A is detected but the object B and the object C are not detected by the object detection process performed on the image data compressed at a compression ratio candidate of 50%.

In the example illustrated in FIG. 22, a result of the object detection process performed on the image data compressed at a compression ratio candidate of 20% is the same as that of the object detection process performed on the image data compressed at a compression ratio candidate of 30%. In this case, the compression ratio candidate of 30% is larger than the compression ratio candidate of 20%. Therefore, the list generation unit 415a includes the compression ratio candidate of 30% in the compression ratio list 422, but does not include the 20% compression ratio candidate in the compression ratio list 422.

In the same manner, in the example illustrated in FIG. 22, a result of the object detection process performed on the image data compressed at a compression ratio candidate of 40% is the same as that of the object detection process performed on the image data compressed at a compression ratio candidate of 50%. In this case, the compression ratio candidate of 50% is larger than the compression ratio candidate of 40%. Therefore, the list generation unit 415a includes the compression ratio candidate of 50% in the compression ratio list 422, but does not include the compression ratio candidate of 40% in the compression ratio list 422.

On the other hand, in the example illustrated in FIG. 22, there is no object detection process that outputs the same result as that of the object detection process performed on the image data compressed at a compression ratio candidate of 10%. Therefore, in this case, the list generation unit 415a includes the compression ratio candidate of 10% in the compression ratio list 422.

By the above operation, the compression ratio list 422 is appropriately generated.

<5> Supplementary Notes

The whole or part of the example embodiments disclosed above can be described as, but not limited to, the following Supplementary Notes.

[Supplementary Note 1]

A data compression apparatus comprising a controller, wherein the controller is programmed to:

perform a compression process of compressing output data that is sequentially outputted as time series data by a monitoring apparatus for monitoring a monitoring target range;

output the output data on which the compression process is performed, to a data processing apparatus that performs an object detection process for detecting an object that exists in the monitoring target range by using the output data; and set a compression ratio used in the compression process, on the basis of an accuracy information that indicates a relationship between a compression ratio at which the output data is compressed and a detection accuracy of the object by the object detection process performed by using the output data compressed at the compression ratio.

[Supplementary Note 2]

The data compression apparatus according to Supplementary Note 1, wherein the controller is programmed to set the compression ratio so that a data size of the output data on which the compression process is performed is less than or equal to an allowable size and the detection accuracy is larger than or equal to an allowable accuracy.

[Supplementary Note 3]

The data compression apparatus according to Supplementary Note 1 or 2, wherein the accuracy information includes:

a first information that indicates a relationship between a compression ratio at which a first data part of the output data relating to a first object located at a first position is compressed and a detection accuracy of the first object detected by the data processing apparatus by using the first data part compressed at the compression ratio; and a second information that indicates a relationship between a compression ratio at which a second data part of the output data relating to a second object located at a second position, which is different from the first position, and a detection accuracy of the second object detected by the data processing apparatus by using the second data part compressed at the compression ratio, and the controller is programmed to separately set the compression ratio used for the first data part in the compression process and the compression ratio used for the second data part in the compression process, on the basis of the accuracy information.

[Supplementary Note 4]

The data compression apparatus according to Supplementary Note 3, wherein the controller is programmed to set the compression ratio so that a sum of data sizes of the first and second data parts on which the compression process is performed is less than or equal to an allowable size and a sum of the detection accuracy of the first object and the detection accuracy of the second object is maximized.

[Supplementary Note 5]

The data compression apparatus according to any one of Supplementary Notes 1 to 4, wherein the controller is programmed to transmit the output data on which the compression process is performed to the data processing apparatus through a communication network, and the controller is programmed to set the compression ratio so that the output data on which the compression process is performed is allowed to be transmitted within a limit of an available bandwidth that is available to the controller in the communication network and the detection accuracy is maximized.

[Supplementary Note 6]

The data compression apparatus according to any one of Supplementary Notes 1 to 5, wherein the controller is programmed to obtain the accuracy information by using an arithmetic model that outputs the relationship between the compression ratio and the detection accuracy when at least a part of the output data is inputted, and to set the compression ratio on the basis of the obtained accuracy information.

[Supplementary Note 7]

The data compression apparatus according to any one of Supplementary Notes 1 to 6, wherein the monitoring apparatus includes at least one of a camera and a three-dimensional scanner, and the output data includes at least one of image data that constitutes moving image data, and point clouds data.

[Supplementary Note 8]

A model generation apparatus comprising a controller, wherein the controller is programmed to:

perform a compression process of compressing learning data, which includes at least one of output data that is sequentially outputted as time series data by a monitoring apparatus for monitoring a monitoring target range and homogeneous data a data type of which is same as that of the output data, at each of a plurality of different compression ratios included in a compression ratio list;

perform an object detection process for detecting an object that exists in the monitoring target range by using the learning data on which the compression process is performed at each of the plurality of different compression ratios;

generate an arithmetic model that is used to infer an accuracy information relating to a relationship between a compression ratio at which the learning data is compressed and a detection accuracy of the object by the object detection process performed by using the learning data compressed at the compression ratio, on the basis of a result of the object detection process and the plurality of different compression ratios used in the compression process; and output the generated arithmetic model to a data compression apparatus that sets a compression ratio for compressing the output data by using the arithmetic model and that compresses the output data at the set compression ratio.

[Supplementary Note 9]

The model generation apparatus according to Supplementary Note 8, wherein the controller is further programmed to set the plurality of different compression ratios included in the compression ratio list, and the controller is programmed to (i) perform the compression process to compress the learning data at each of a plurality of different compression ratio candidates, which are candidates of the compression ratios included in the compression ratio list and (ii) perform the object detection process to detect the object that exists in the monitoring target range by using the learning data compressed at each of the plurality of different compression ratio candidates, when there are at least two compression ratio candidates that result in the same detection result of the object detection process among the plurality of different compression ratio candidates, the controller is programmed to set a maximum one of the at least two compression ratio candidates as the compression ratio included in the compression ratio list.

[Supplementary Note 10]

A data compression method, which is performed by a computer, including:

performing a compression process of compressing output data that is sequentially outputted as time series data by a monitoring apparatus for monitoring a monitoring target range;

outputting the output data on which the compression process is performed, to a data processing apparatus that performs an object detection process for detecting an object that exists in the monitoring target range by using the output data; and setting a compression ratio used in the compression process, on the basis of an accuracy information that indicates a relationship between a compression ratio at which the output data is compressed and a detection accuracy of the object by the object detection process performed by using the output data compressed at the compression ratio.

[Supplementary Note 11]

A model generation method, which is performed by a computer, comprising:

performing a compression process of compressing learning data, which includes at least one of output data that is sequentially outputted as time series data by a monitoring apparatus for monitoring a monitoring target range and homogeneous data a data type of which is same as that of the output data, at each of a plurality of different compression ratios included in a compression ratio list;

performing an object detection process for detecting an object that exists in the monitoring target range by using the learning data on which the compression process is performed at each of the plurality of different compression ratios;

generating an arithmetic model that is used to infer an accuracy information relating to a relationship between a compression ratio at which the learning data is compressed and a detection accuracy of the object by the object detection process performed by using the learning data compressed at the compression ratio, on the basis of a result of the object detection process and the plurality of different compression ratios used in the compression process; and outputting the generated arithmetic model to a data compression apparatus that sets a compression ratio for compressing the output data by using the arithmetic model and that compresses the output data at the set compression ratio.

[Supplementary Note 12]

A non-transitory program recording medium on which a computer program that allows a computer to execute a data compression method is recorded, the data compression method including:

performing a compression process of compressing output data that is sequentially outputted as time series data by a monitoring apparatus for monitoring a monitoring target range;

outputting the output data on which the compression process is performed, to a data processing apparatus that performs an object detection process for detecting an object that exists in the monitoring target range by using the output data; and setting a compression ratio used in the compression process, on the basis of an accuracy information that indicates a relationship between a compression ratio at which the output data is compressed and a detection accuracy of the object by the object detection process performed by using the output data compressed at the compression ratio.

[Supplementary Note 13]

A non-transitory program recording medium on which a computer program that allows a computer to execute a model generation method is recorded, the model generation method including:

performing a compression process of compressing learning data, which includes at least one of output data that is sequentially outputted as time series data by a monitoring apparatus for monitoring a monitoring target range and homogeneous data a data type of which is same as that of the output data, at each of a plurality of different compression ratios included in a compression ratio list;

performing an object detection process for detecting an object that exists in the monitoring target range by using the learning data on which the compression process is performed at each of the plurality of different compression ratios;

generating an arithmetic model that is used to infer an accuracy information relating to a relationship between a compression ratio at which the learning data is compressed and a detection accuracy of the object by the object detection process performed by using the learning data compressed at the compression ratio, on the basis of a result of the object detection process and the plurality of different compression ratios used in the compression process; and outputting the generated arithmetic model to a data compression apparatus that sets a compression ratio for compressing the output data by using the arithmetic model and that compresses the output data at the set compression ratio.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is not limited to the above described examples and is allowed to be changed, if desired, without departing from the essence or spirit of the invention which can be read from the claims and the entire specification. A data compression apparatus, a model generation apparatus, a data compression method, a model generation method, and a program recording medium, which involve such changes, are also intended to be within the technical scope of the present invention.

DESCRIPTION OF REFERENCE NUMERALS

1 Camera
2 Data compression apparatus
21 Arithmetic apparatus
211 Compression ratio setting unit
212 Data compression unit
213 Transmission control unit
22 Storage apparatus
221 Detection probability inference model
3 Data processing apparatus
4 Model generation apparatus
41 Arithmetic apparatus
411 Data compression unit
412 Detection processing unit
413 Model Generation unit
414 Transmission control unit
42 Storage apparatus
421 Learning Dataset
422 Compression ratio list
423 Label data
SYS Data compression system

What is claimed is:

1. A data compression apparatus comprising a controller, wherein the controller is programmed to:

compress output data that is sequentially outputted as time series data by a monitoring apparatus for monitoring a monitoring target range;

output the compressed output data to a data processing apparatus that detects an object that exists in the monitoring target range by using the output data; and set a compression ratio used by the controller for compressing the output data, on the basis of an accuracy information that indicates a relationship between a compression ratio at which the output data is compressed and a detection accuracy of the object detected by the data processing apparatus by using the output data compressed at the compression ratio, wherein the accuracy information includes:

a first information that indicates a relationship between a compression ratio at which a first data part of the output data relating to a first object located at a first position is compressed and a detection accuracy of the first object detected by the data processing apparatus by using the first data part compressed at the compression ratio; and a second information that indicates a relationship between a compression ratio at which a second data part of the output data relating to a second object located at a second position, which is different from the first position, and a detection accuracy of the second object detected by the data processing apparatus by using the second data part compressed at the compression ratio, and the controller is programmed to separately set the compression ratio used for the first data part in the compression process and the compression ratio used for the second data part in the compression process, on the basis of the accuracy information.

2. The data compression apparatus according to claim 1, wherein the controller is programmed to set the compression ratio so that a data size of the output data on which the compression process is performed is less than or equal to an allowable size and the detection accuracy is larger than or equal to an allowable accuracy.

3. The data compression apparatus according to claim 1, wherein
the controller is programmed to set the compression ratio so that a sum of data sizes of the first and second data parts on which the compression process is performed is less than or equal to an allowable size and a sum of the detection accuracy of the first object and the detection accuracy of the second object is maximized.

4. The data compression apparatus according to claim 1, wherein
the controller is programmed to transmit the compressed output data to the data processing apparatus through a communication network, and
the controller is programmed to set the compression ratio so that the compressed output data is allowed to be transmitted within a limit of an available bandwidth that is available to the controller in the communication network and the detection accuracy is maximized.

5. The data compression apparatus according to claim 1, wherein
the controller is programmed to obtain the accuracy information by using an arithmetic model that outputs the relationship between the compression ratio and the detection accuracy when at least a part of the output data is inputted, and to set the compression ratio on the basis of the obtained accuracy information.

6. The data compression apparatus according to claim 1, wherein
the monitoring apparatus includes at least one of a camera and a three-dimensional scanner, and
the output data includes at least one of image data that constitutes moving image data, and point clouds data.

7. A data compression method, which is performed by a computer, including:
performing a compression process of compressing output data that is sequentially outputted as time series data by a monitoring apparatus for monitoring a monitoring target range;
outputting the output data on which the compression process is performed, to a data processing apparatus that performs an object detection process for detecting an object that exists in the monitoring target range by using the output data; and
setting a compression ratio used in the compression process, on the basis of an accuracy information that indicates a relationship between a compression ratio at which the output data is compressed and a detection accuracy of the object by the object detection process performed by using the output data compressed at the compression ratio,
wherein
the accuracy information includes:
a first information that indicates a relationship between a compression ratio at which a first data part of the output data relating to a first object located at a first position is compressed and a detection accuracy of the first object by using the first data part compressed at the compression ratio; and
a second information that indicates a relationship between a compression ratio at which a second data part of the output data relating to a second object located at a second position, which is different from the first position, and a detection accuracy of the second object by using the second data part compressed at the compression ratio, and
separately setting the compression ratio used for the first data part in the compression process and the compression ratio used for the second data part in the compression process, on the basis of the accuracy information.

8. A non-transitory program recording medium on which a computer program that allows a computer to execute a data compression method is recorded,
the data compression method including:
performing a compression process of compressing output data that is sequentially outputted as time series data by a monitoring apparatus for monitoring a monitoring target range;
outputting the output data on which the compression process is performed, to a data processing apparatus that performs an object detection process for detecting an object that exists in the monitoring target range by using the output data; and
setting a compression ratio used in the compression process, on the basis of an accuracy information that indicates a relationship between a compression ratio at which the output data is compressed and a detection accuracy of the object by the object detection process performed by using the output data compressed at the compression ratio,
wherein
the accuracy information includes:
a first information that indicates a relationship between a compression ratio at which a first data part of the output data relating to a first object located at a first position is compressed and a detection accuracy of the first object by using the first data part compressed at the compression ratio; and
a second information that indicates a relationship between a compression ratio at which a second data part of the output data relating to a second object located at a second position, which is different from the first position, and a detection accuracy of the second object by using the second data part compressed at the compression ratio, and
separately setting the compression ratio used for the first data part in the compression process and the compression ratio used for the second data part in the compression process, on the basis of the accuracy information.

* * * * *